(12) United States Patent
Karlen

(10) Patent No.: US 7,203,570 B2
(45) Date of Patent: Apr. 10, 2007

(54) STOWAGE AND RETRIEVAL SYSTEM

(76) Inventor: James P. Karlen, 3050 Clover Rd., Bethel, OH (US) 45106

( * ) Notice: Subject to any disclaimer, the term of this patent is extended or adjusted under 35 U.S.C. 154(b) by 124 days.

(21) Appl. No.: 11/032,892

(22) Filed: Jan. 11, 2005

(65) Prior Publication Data
US 2006/0058912 A1 Mar. 16, 2006

Related U.S. Application Data

(63) Continuation of application No. 10/036,845, filed on Dec. 21, 2001, now Pat. No. 6,842,665.

(60) Provisional application No. 60/257,232, filed on Dec. 21, 2000.

(51) Int. Cl.
G06F 7/00 (2006.01)

(52) U.S. Cl. .................. 700/213; 414/143.2

(58) Field of Classification Search ............... 700/213, 700/217; 414/143.2, 331.03; 198/358; 108/51.11, 53.1, 53.3, 55.1; 114/73, 77 R; 220/1.5, 23.2, 23.4, 23.6
See application file for complete search history.

(56) References Cited

U.S. PATENT DOCUMENTS

| | | | |
|---|---|---|---|
| 2,956,763 A * | 10/1960 | D'Arca ..................... 108/53.1 |
| 3,356,040 A * | 12/1967 | Fonden ................. 104/130.01 |
| 3,554,389 A | 1/1971 | Bright |
| 3,622,020 A | 11/1971 | Sarvary |
| 3,664,273 A | 5/1972 | Howe |
| 3,683,821 A | 8/1972 | Mangold |
| 3,800,963 A | 4/1974 | Holland |
| 3,860,130 A | 1/1975 | Frangos |
| 3,933,257 A | 1/1976 | Weber |
| 4,098,409 A | 7/1978 | Massey |
| 4,186,841 A | 2/1980 | Buckley et al. |
| 4,480,748 A | 11/1984 | Wind |
| 4,638,744 A | 1/1987 | Clive-Smith |
| 4,662,532 A | 5/1987 | Anderson et al. |
| 4,773,547 A | 9/1988 | Bell |
| 4,793,262 A * | 12/1988 | Horn .......................... 104/168 |
| 4,878,796 A | 11/1989 | Ammeraal |
| 4,897,012 A | 1/1990 | Brewer |
| 5,271,701 A | 12/1993 | Hopland |
| 5,285,909 A | 2/1994 | Slater |
| 5,329,862 A * | 7/1994 | Breezer et al. ............ 108/55.5 |
| 5,345,879 A | 9/1994 | Maillard |
| 5,388,532 A | 2/1995 | Wakano |
| 5,395,119 A * | 3/1995 | Jacob et al. ................ 273/274 |
| 5,395,199 A * | 3/1995 | Day et al. ................... 414/267 |
| 5,404,821 A | 4/1995 | Bond |
| 5,407,316 A | 4/1995 | Coatta et al. |
| 5,412,863 A * | 5/1995 | Prodel ......................... 29/799 |
| 5,415,311 A | 5/1995 | Coogan |
| 5,487,636 A * | 1/1996 | Mkrtchyan .................. 414/286 |

(Continued)

Primary Examiner—Khoi H. Tran
(74) Attorney, Agent, or Firm—Dinsmore & Shohl LLP

(57) ABSTRACT

A storage and retrieval system is provided that automates the process of handling a mixed inventory of palletized and containerized items. The invention is particularly useful in handling cargo and weapons within a ship's hold or magazine. When used on a ship, the invention provides for the stowing and unstowing of loads quickly and efficiently, to automatically secure such payloads for sea and to achieve high stowage density, while retaining the capability to select and retrieve any ordered payload, move it to and load it on elevator trays under computer control.

10 Claims, 19 Drawing Sheets

U.S. PATENT DOCUMENTS

| | | |
|---|---|---|
| 5,669,753 A | 9/1997 | Schween |
| 5,707,199 A | 1/1998 | Faller |
| 5,857,413 A * | 1/1999 | Ward .......................... 104/48 |
| 5,862,917 A | 1/1999 | Noble et al. |
| 5,915,905 A * | 6/1999 | Hopland ................. 414/139.4 |
| 6,059,521 A * | 5/2000 | Rapeli ........................ 414/803 |
| 6,077,019 A | 6/2000 | Corcoran |
| 6,148,752 A | 11/2000 | Upmeyer |
| 6,170,686 B1 | 1/2001 | Flores |
| 6,230,640 B1 | 5/2001 | Nordstrom et al. |
| 6,279,763 B1 | 8/2001 | Bush |
| 6,315,513 B1 | 11/2001 | Harukawa et al. |
| 6,325,224 B1 * | 12/2001 | Brown ....................... 211/194 |
| 6,340,136 B1 * | 1/2002 | Luria ....................... 244/118.1 |
| 6,842,665 B2 * | 1/2005 | Karlen ....................... 700/217 |
| 2002/0182035 A1 * | 12/2002 | Karlen .................... 414/143.2 |

* cited by examiner

STOWAGE AND RETRIEVAL SYSTEM

CROSS-REFERENCE TO RELATED APPLICATIONS

The present application is a continuation application of U.S. patent application Ser. No. 10/036,845, filed Dec. 21, 2001 now U.S. Pat. No. 6,842,665, which claims the benefit of U.S. Provisional Patent Application Ser. No. 60/257,232, filed Dec. 21, 2000, the entire disclosures of which are hereby incorporated herein by reference.

GOVERNMENT LICENSE RIGHTS

The United States Government may have certain rights in some aspects of the invention claimed herein, as the invention was made with United States Government support under award/contract number N65540-00-C-0061 issued by the U.S. Naval Surface Warfare Center, Carderock Division.

TECHNICAL FIELD

The present invention relates generally to an automated stowage and retrieval system designed to accommodate palletized and containerized freight of various dimensions. While the invention has utility in a variety of environments, it is specifically disclosed in connection with a shipboard system for handling cargo and weapons within the holds and magazines of naval vessels or other ships at sea, providing means to automatically stow and retrieve individual palletized or containerized payloads, to stow such payloads as densely as possible within the three-dimensional volume of a given hold or magazine, to automatically load and unload the freight elevators that serve the storeroom, and to automatically secure individual payloads and stacks of payloads for safe transit in the storeroom and during conveyance to other locations.

BACKGROUND OF THE INVENTION

Cargo and weapons bound for a naval vessel or other type of ship are normally packaged for transportation and stowage in one of two ways: goods are either secured to a pallet or are enclosed in a shipping container. Based on a typical inventory of weapons and stores aboard a current-generation aircraft carrier or other surface combatant, most pallets measure 44 inches in length by 40 inches in height and can weigh as much as 3,800 pounds. Containerized loads, in which the cargo or weapons are fully enclosed in a rigid box, can weigh up to 9,640 pounds, with lengths up to 312 inches. Individual pallets and containers of all types and sizes are handled many times by various crews and equipment and may be restowed in the holds of several different ships before reaching their ultimate point of use.

Such palletized and containerized cargo and weapons payloads are generally first moved from locations in pierside warehouses or weapons storage depots to staging areas on a dock using forklift trucks. They are then hoisted onto the top deck of a shuttle ship or a specialized cargo vessel called an Underway Replenishment (UNREP) ship using conventional cranes. Once aboard the shuttle or UNREP ship, the pallets and containers are again moved with forklifts, pallet movers, or sometimes cranes to one of several elevators, where they are lowered for stowage into a hold or magazine on one of the vessel's five or six cargo decks.

After descending to the appropriate hold or magazine, each pallet or container is removed from the elevator platform using another forklift truck and is deposited at its particular stowage site in the storeroom, where it is usually stacked on identical pallets or containers to the maximum height permitted by either container capacity or the height of the storeroom ceiling. Each individual load or stack is then manually secured to the deck for safe transit at sea using tie-down straps, chains, nets or blocking. When the time comes to transfer the pallets and containers from the UNREP ship to a surface combatant during transit at sea, the procedure is reversed, and when the cargo finally reaches the combatant ship, the same procedures are again employed, using a series of lift trucks and elevators to restow the pallets and containers in holds and magazines located below decks.

This stowage and retrieval process is extremely time-consuming, manpower-intensive, and inefficient. For example, during the cargo retrieval process, forklift operators in each hold or weapons magazine must select the pallet or container that has been ordered, manually remove the tie-down straps, chains, nets or other restraining devices that were previously installed to secure it to the hold deck for safe transit at sea, and then pick up the load, maneuver it between the other stored cargo, and deliver it to the elevator trunk. When the elevator platform becomes available, the forklift drives onto the platform and deposits the payload. The elevator must wait until all of the weapons or cargo requested from that magazine or hold have been acquired and loaded before it can deliver the goods to their destination, delaying parallel activities in the other magazines and holds that the elevator services.

Forklift trucks, which are typically the prime movers for horizontal operations in this entire sequence of events, have certain intrinsic disadvantages for this application. First, they require wide aisles within which to maneuver to pick up or deposit a payload, and to access each with their tines, so the cargo in each hold or magazine cannot be stowed as densely as desired. Second, forklift trucks are by-nature quite heavy themselves and thus place undue stress on the elevator platform and its actuator system when driven onto the freight elevator carrying individual payloads. Third, as discussed, payloads must be unloaded from or loaded onto the freight elevator platform one at a time, so the elevator must wait until the each is individually stowed or retrieved. Fourth, forklifts have proved to be quite maintenance-intensive and costly over their service life. Finally, this cargo and weapons stowage and retrieval process must often be performed in high seas, where even the largest surface vessels, such as aircraft carriers, pitch and roll violently. In certain sea states, handling large and heavy palletized and containerized loads with forklift trucks becomes unsafe and the process must be stopped.

Despite continuing efforts on the part of the Navy and commercial operators to maximize efficiency in transporting, handling and stowing palletized and containerized cargo and weapons at sea, an automated stowage and retrieval system has not yet been provided that achieves high three-dimensional stowage density within a given hold or magazine, permits any payload contained in the storeroom to be accessed, loads and unloads associated service elevators quickly, and automatically secures those payloads for transit in rough seas.

SUMMARY OF THE INVENTION

Accordingly, to overcome the above and other problems, it is an object of the present invention to provide an automated stowage and retrieval system for palletized and containerized items of a variety of sizes, particularly providing a system to increase the volumetric density of stowage in an enclosed storage space.

It is another object of this invention to set forth a system of standard payload interface fixtures which, when affixed to individual payloads, provide means to grasp both containerized and palletized cargo securely for movement by handling equipment within the hold or magazine and to automatically lock payloads to one another, when stacked, and to other means of transport, such as elevators, for safe transit under high accelerations.

It is another object of this invention to utilize a set of computer-controlled powered transporters, called pallet carriers, disposed in a two-axis matrix on the storeroom floor to convey stacks of payloads within the stowage system providing means to move any given payload in a series of steps from its initial location within the matrix to an unload station on the edge of the matrix, thus eliminating the need for fixed aisles and achieving high three-dimensional stowage density within a given-storage space.

It is another object of this invention to provide a system by which to load and unload freight elevators servicing a hold automatically and efficiently, as well as to transport individual pallets and containers from one stowage location to another, through the use of interchangeable and exchangeable elevator platforms, called elevator loading trays, which, when loaded with one or more payloads outfitted with standard payload interfaces, can be slid as a unit onto or off of a freight elevator in a single stroke.

Still other objects of the present invention will become apparent to those skilled in this art from the following description wherein there is shown and described a preferred embodiment of this invention, by way of illustration, of the best mode as contemplated for carrying out the invention. As will be realized, the invention is capable of other different, obvious aspects, all without departing from the invention. Accordingly, the drawings and description should be regarded as illustrative in nature and not restrictive.

BRIEF DESCRIPTION OF THE DRAWINGS

The accompany drawings incorporated in and forming a part of the specification, illustrate several aspects of the present invention, and together with the description, serve to explain the principles of the invention. In the drawings:

FIG. 14 is an orthographic view of the pallet carrier showing two stacks of pallets with standard payload interfaces locked on;

FIG. 15 is an orthographic view of the pallet carrier showing one container with standard payload interface locked on;

DETAILED DESCRIPTION OF THE PREFERRED EMBODIMENTS

The present invention providing for a stowage and retrieval system that is particularly useful in automating the process of handling palletized and containerized items of various sizes. A system constructed in accordance with the invention may include the capability to select any payload contained in the system that is ordered, move it to and load it onto service elevators under computer control. The invention has particular utility in the stowage and retrieval of cargo and weapons within the holds and magazines of naval vessels.

Figure 1:
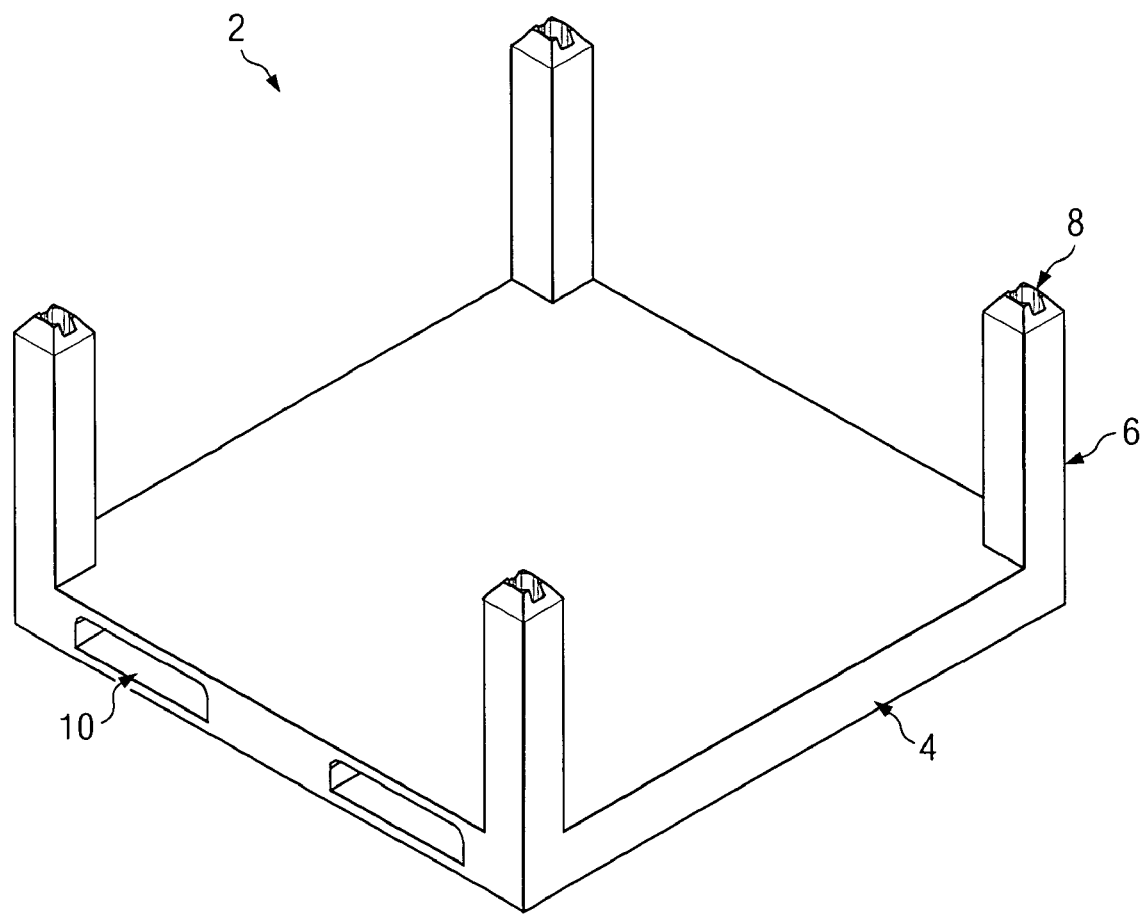
FIG. 1 is an orthographic view of a standard payload interface fixture.

Referring now to the drawings, FIG. 1 provides an orthographic view of a standard payload interface fixture 2 (standard payload interface) to be attached to or built into containerized and palletized loads and used to provide a convenient means to acquire an individual payload securely with material handling equipment, to stack such payloads, and to automatically lock such payloads to one another to form rigid stacks and to pallet carriers or other conveyance systems for safe transit under high dynamic loads. Within the stowage and retrieval system, and in other sections of the overall material transportation system used to convey palletized and containerized cargo and weapons within a ship, between ships, or between ship and shore, these standard payload interface fixtures 2 provide a platform by which to transport goods of various sizes. In a preferred embodiment, each standard payload interface fixture 2 has four stanchions 6 which extend vertically upward from a base plate 4 providing the structure on which the cargo is to be placed. Standard payload interface details such as stanchions 6 and cam-lock mechanisms 12 may also be incorporated as an integral part of new pallets and containers, rather than being provided as an addition to be attached fixed to existing packaging. The base plate 4 contains a pair of channels 10 which accept forklift tines permitting the transport of payloads in a more traditional manner. Stanchions 6 are located at each corner of the base plate 4. In a preferred embodiment of the present invention, the stanchions 6 are fabricated from steel tubing and the base plate 4 on which the stanchions 6 are mounted is formed from steel sheet metal. The base plate 4 measures 50 inches in length and 53 inches in width, providing a useable stowage area or payload "footprint" of 48 inches by 45 inches with space for the four inch square stanchions 6, leaving a single inch clearance to the edge of the standard payload interface fixture 2. By varying the length of the steel tubing sections, stanchions 6 can be easily provided to users in a range in heights depending on the height of a particular containerized or palletized payload. Several standard stanchion heights would be produced, and one particular stanchion height would be selected for a given type of payload to minimize the vertical space wasted between stacked payloads in the stowage system. Each stanchion 6 has a machined steel cam-lock receptacle 8 on its top, shaped in a protruding pyramidal or cylindrical form. Indentations of identical form are provided at the base of each stanchion 6. These protrusions on the stanchions 8 engage said indentations to assist in guidance and seating and to react side loads when one payload is stacked upon another, or when a payload is deposited upon a pallet carrier 4, elevator loading tray 18, or any other form of payload conveyance outfitted with cam-lock receptacle features. The machined steel cam-lock receptacle 8 also serves as a receiver for the dual-lug cam-lock tool 22 which is used to engage the standard payload interface fixture and simultaneously actuate the cam-lock mechanism contained in each stanchion 6. A set of four actuated dual-lug cam-lock tools 22 provided on the vertical slide assembly 94 of a robotic manipulator 90 is used to automatically engage the four stanchions 6 of the standard payload interface fixture being acquired, and to move and to stack and unstack those payloads. Said cam-lock tool 22 can be incorporated in any other material handling equipment used to move said payloads, including forklift trucks, hoists, and cranes.

Figure 2:
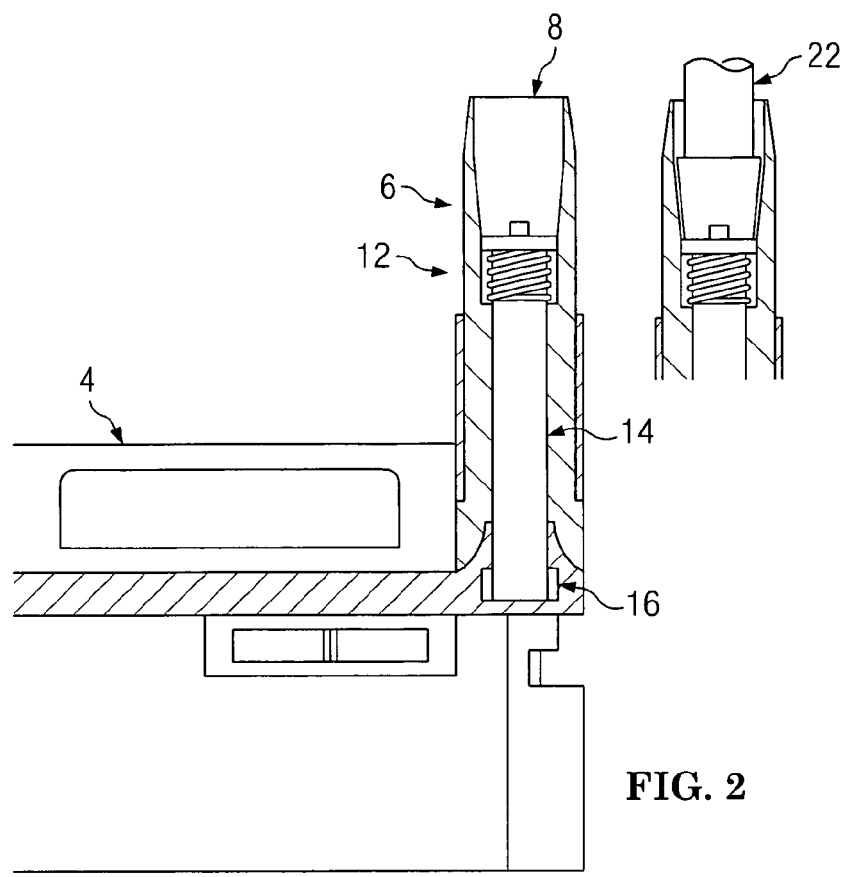
FIG. 2 is a cutaway view of the spring-loaded cam-lock mechanism provided within each standard payload interface vertical stanchion, showing the engagement of a dual-lug cam-lock and a receptacle.

FIG. 2 provides a cutaway view to illustrate the cam-lock mechanism 12 contained within the stanchion 6. The cam-lock mechanism 12 contained within the stanchion 6 is actuated by the cam-lock tool 22 provided on the robotic manipulator 90 or any other material handling equipment properly outfitted. The cam-lock mechanism 12 is a spring-loaded steel shaft 14 that runs from the cam-lock receptacle 8 to the bottom of the stanchion 6 with a two-ear cam 16 at its base. The robotic manipulator 90 simultaneously inserts its set of four cam-lock tools 22 into the four cam-lock receptacles 8 at the top of the stanchions 6 provided on a standard payload interface fixture, creating a widely-spaced, stable locking configuration. When the four identical cam-lock tools 22 are simultaneously rotated 90 degrees by associated actuators, each cam-lock tool 22 simultaneously rotates the cam-lock mechanism 12 in each stanchion 6 and automatically disengages that particular standard payload interface fixture 2 from the standard payload interface fixture 2 on which it is stacked or from a pallet carrier 32, elevator loading tray 120, or any like item which contains cam-lock receptacles 8.

Figure 3:
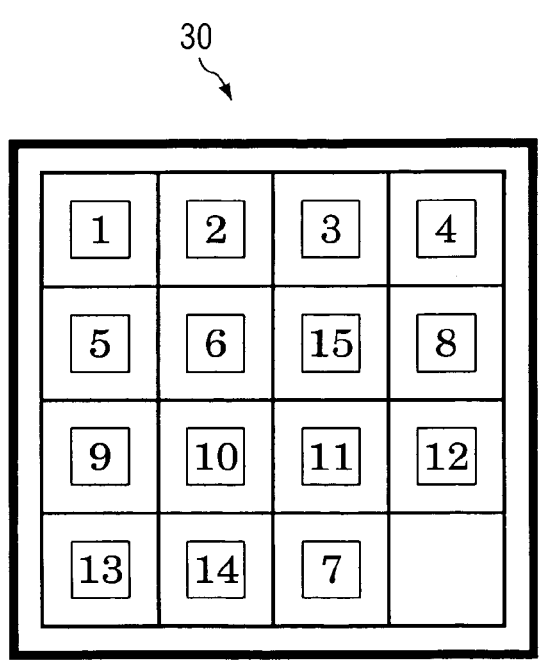
FIG. 3 is a diagram illustrating the "slide puzzle" matrix principle employed in the automated stowage and retrieval system.
Figure 4:
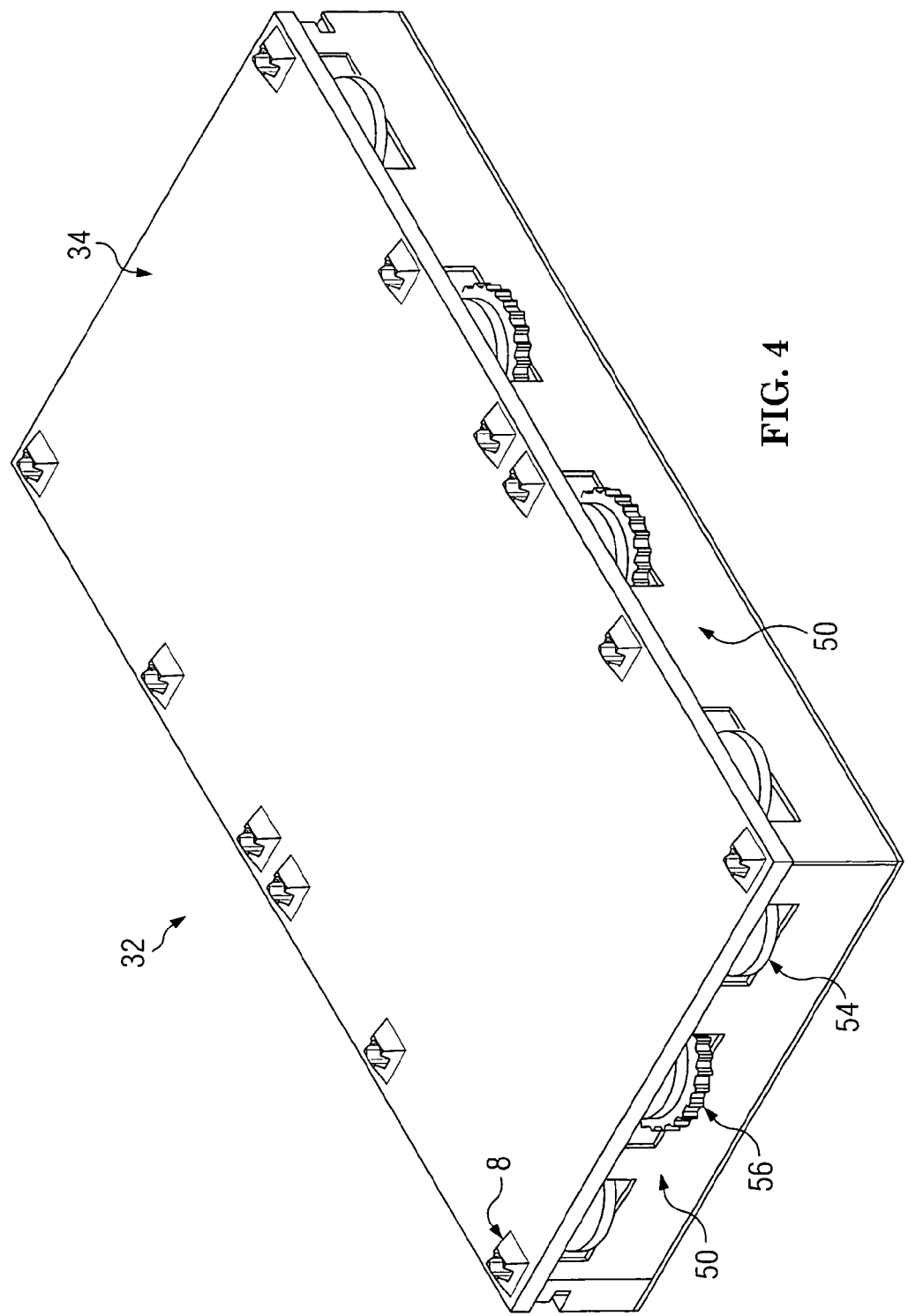
FIG. 4 is an orthographic view of the upper surface of a self-powered pallet carrier showing the edge-mounted guidance and drive system.
Figure 5:
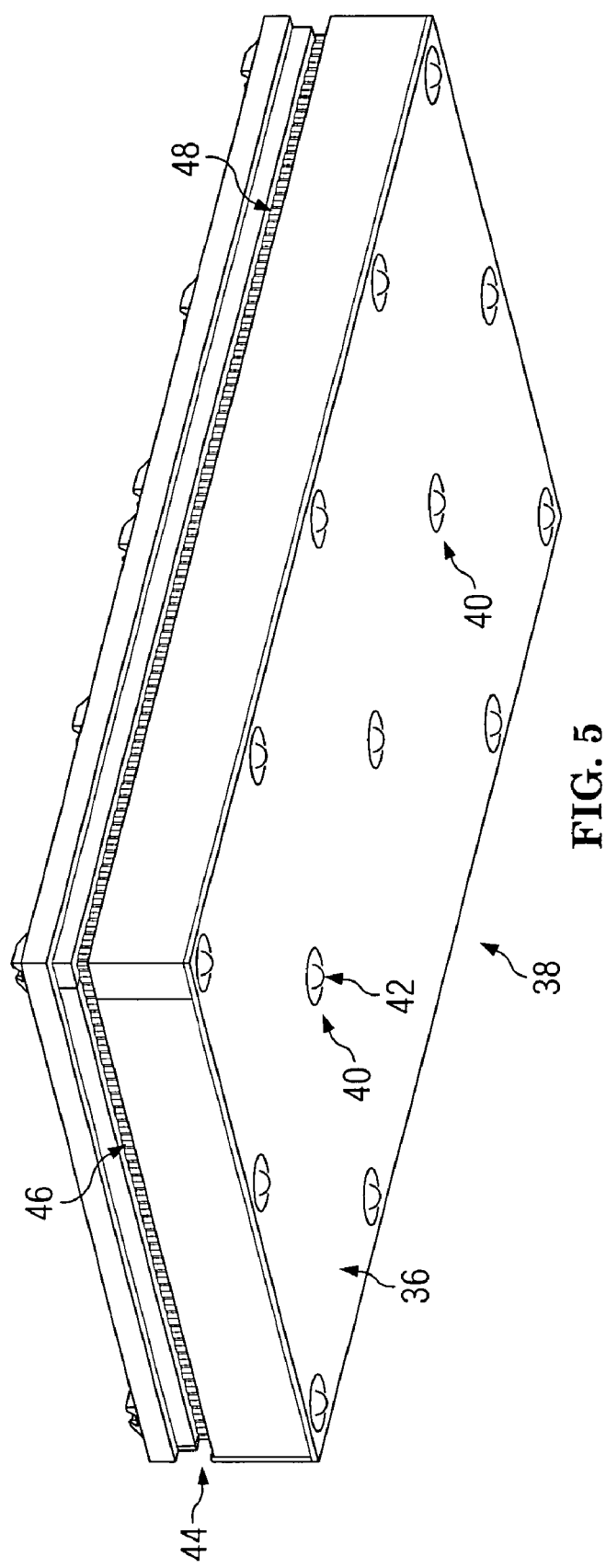
FIG. 5 is a perspective view of the lower surface of the self-powered pallet carrier indicating the edge-mounted guidance and drive systems and the vertical load transfer system.
Figure 14:
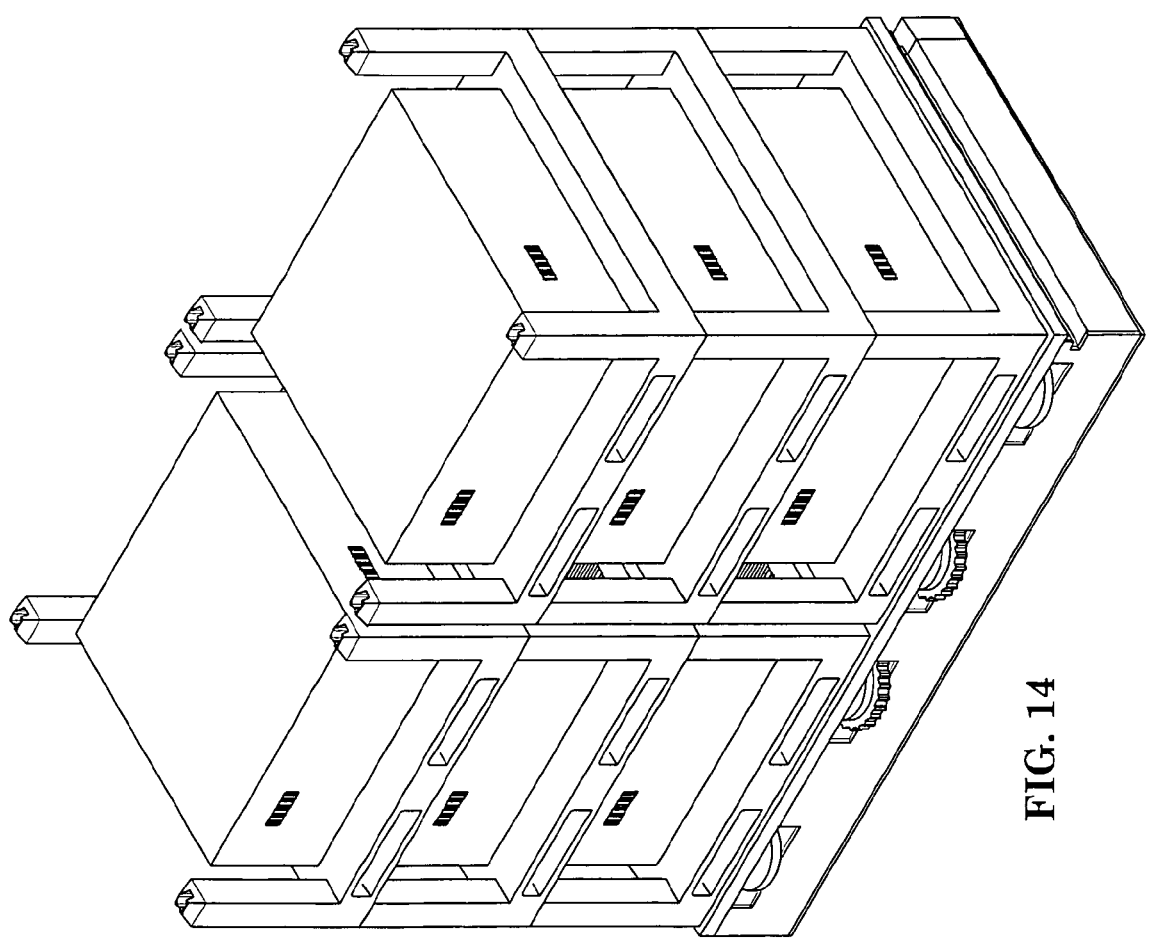
Figure 15:
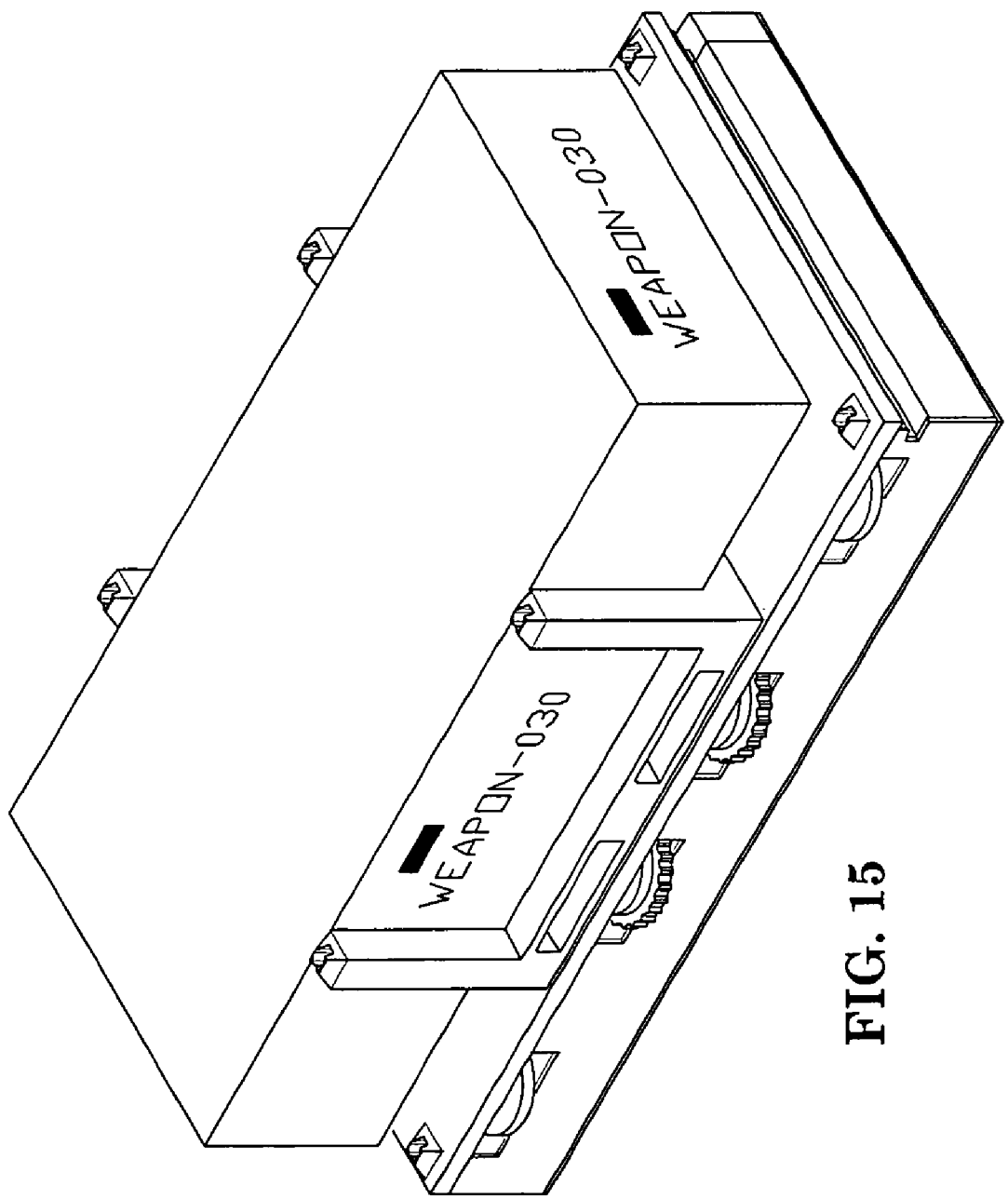
Figure 16:
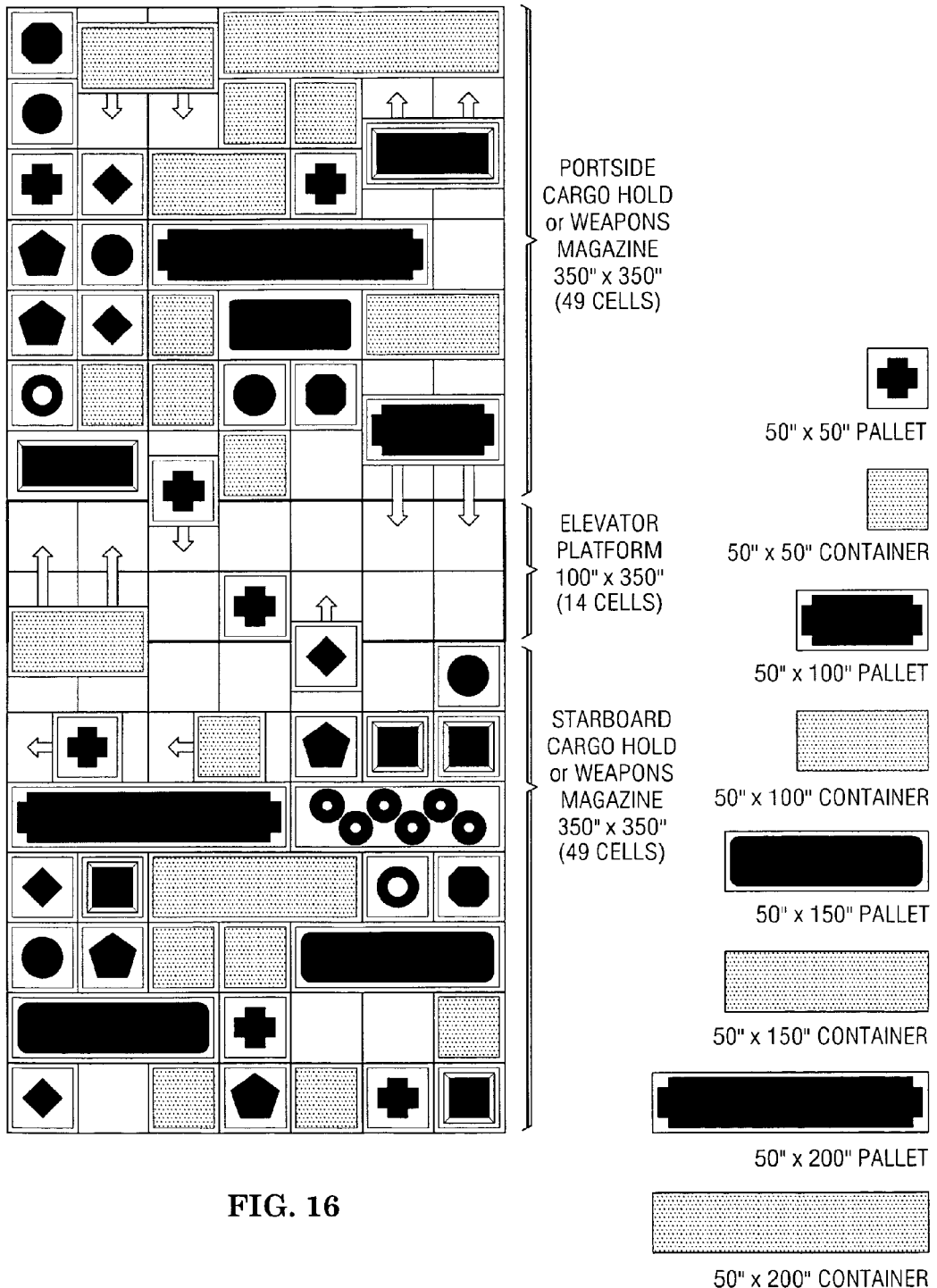
FIG. 16 is a plan view of the automated stowage and retrieval system with square-shaped, passive pallet carriers that employ floor-mounted drives and guides.
Figure 17:
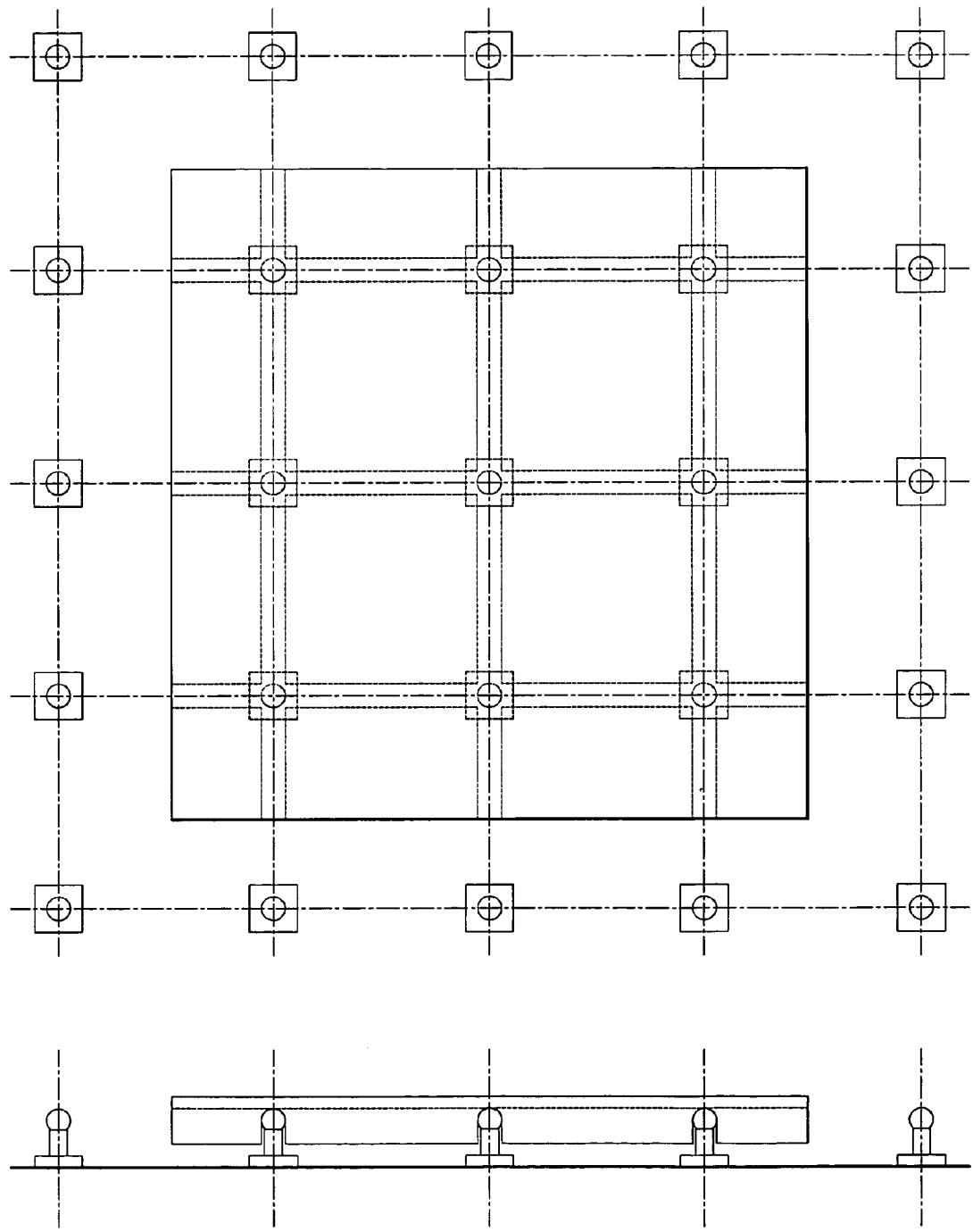
FIG. 17 is a plan view and side elevation of showing a system of floor-mounted roller guides for passive pallet carriers.

FIG. 3 illustrates the "slide-puzzle" principle employed in the current invention to move pallet carriers 32 and any attached payloads within the slide matrix 30. This mechanical geometry provides a very efficient means to pack the maximum amount of cargo into a limited three-dimensional space. FIGS. 4 and 5 provide an orthographic view of the upper and lower surfaces 36 of a pallet carrier 32, showing the configuration of the pallet carrier drive, guidance and vertical load carrying subsystems, in addition to the cam-lock receptacles 8 provided on the base plate 4 of the standard payload interface fixture 2 and on the elevator loading tray 120. In FIG. 4, the cam-lock receptacles 8 are arranged in a pattern to accommodate a single stack of standard payload interface fixtures 2 centered on the pallet carrier, as illustrated in FIG. 15, or two adjacent stacks of standard payload interface fixtures 2, as illustrated in FIG. 14, depending on the lengths of the payloads being carried. The edge-mounted drive and guidance system of the pallet carrier 32 illustrated in FIGS. 4, 5 and 6, functions to move the pallet carrier 32 along the x and y axes of the slide matrix 30. Many drive and guidance configurations can be implemented to achieve that desired result, such as advanced-design linear electric motors, rack and pinion actuators, and timing belt actuators. Furthermore, each of these drive and guidance systems could be located either within the pallet carrier 32 itself, or on the deck beneath the pallet carrier 32. As shown in FIG. 4, one particular embodiment of the invention uses a set of drive pinions 56 each attached directly to a guide roller located on two adjacent edges of the pallet carrier 32, driving against one of a pair of racks 46 and guiding along one of a pair of steel ways 44 located on an adjacent pallet carrier, as illustrated in FIG. 5.

FIG. 5 also properly depicts a vertical load-bearing system for the pallet carrier 32. The vertical load-bearing system permits the pallet carriers 32 to move more effortlessly along the deck or subfloor within the slide matrix 30. In one embodiment of the invention, as illustrated in FIG. 5, the vertical load-bearing system is comprised of ball transfer units 40 which provide the necessary antifriction motion in the system. Typically, these ball transfer units 40 comprise ball bearings 42 which can be employed in arrays on floors or conveyor tables to support large payloads. These ball bearings 42 can be mounted on either the subfloor with the balls projected upward, or mounted on the lower surface 36 of the pallet carrier 32 with the balls projected downward.

The pallet carrier 32 can be composed of numerous materials, including ferrous and nonferrous metals, and polymer composites. In a preferred embodiment of the present invention, the pallet carrier 32 is an aluminum box structure, rectangular in plan view, comprised of plates on its sides and lower surface 36, having internal stiffeners or transoms with cutouts, and a thick plate for the upper surface 34. The upper surface 34 also incorporates lightening cut-outs to provide easy access to the internal components of the pallet carrier 32. While constructed primarily of aluminum, certain steel inserts, such as the cam-lock receptacles 8, located on the upper surface 34, are provided to increase local strength and stiffness, and to provide adequate wear surfaces for the cam-lock mechanism 12. In this preferred embodiment, a set of ball transfer units 42 which provide nearly friction-free motion to the pallet carriers 32 are mounted to the lower surface 36 and the pallet carrier 32 rides on the steel deck or subfloor. In a more preferred embodiment, the ball bearings 42 are two inch in diameter and are comprised of hardened stainless steel.

Also within this preferred embodiment, the guidance system 44 for the pallet carrier 32 utilizes a set of ten inch diameter by one and one-half inch thick stainless steel rollers 46, each mounted on a pair of tapered roller bearings 48, which occupy two sides of the pallet carrier 32. These rollers function as both guides in the x and y axes and as lateral supports for the loaded pallet carrier 32 while it is moving. Furthermore, in this preferred embodiment, four such rollers are located on the long side of the pallet carrier 32 and three on the short side. The rollers are designed to bear against stainless steel guideways located on the sides of a adjacent pallet carriers 32 in the slide matrix 30. In a more preferred embodiment, the pallet carrier 32 is 104 inches in length and 55 inches in width, and is designed to accommodate multiple standard payload interfaces 2 as shown in FIG. 14.

Figure 6:
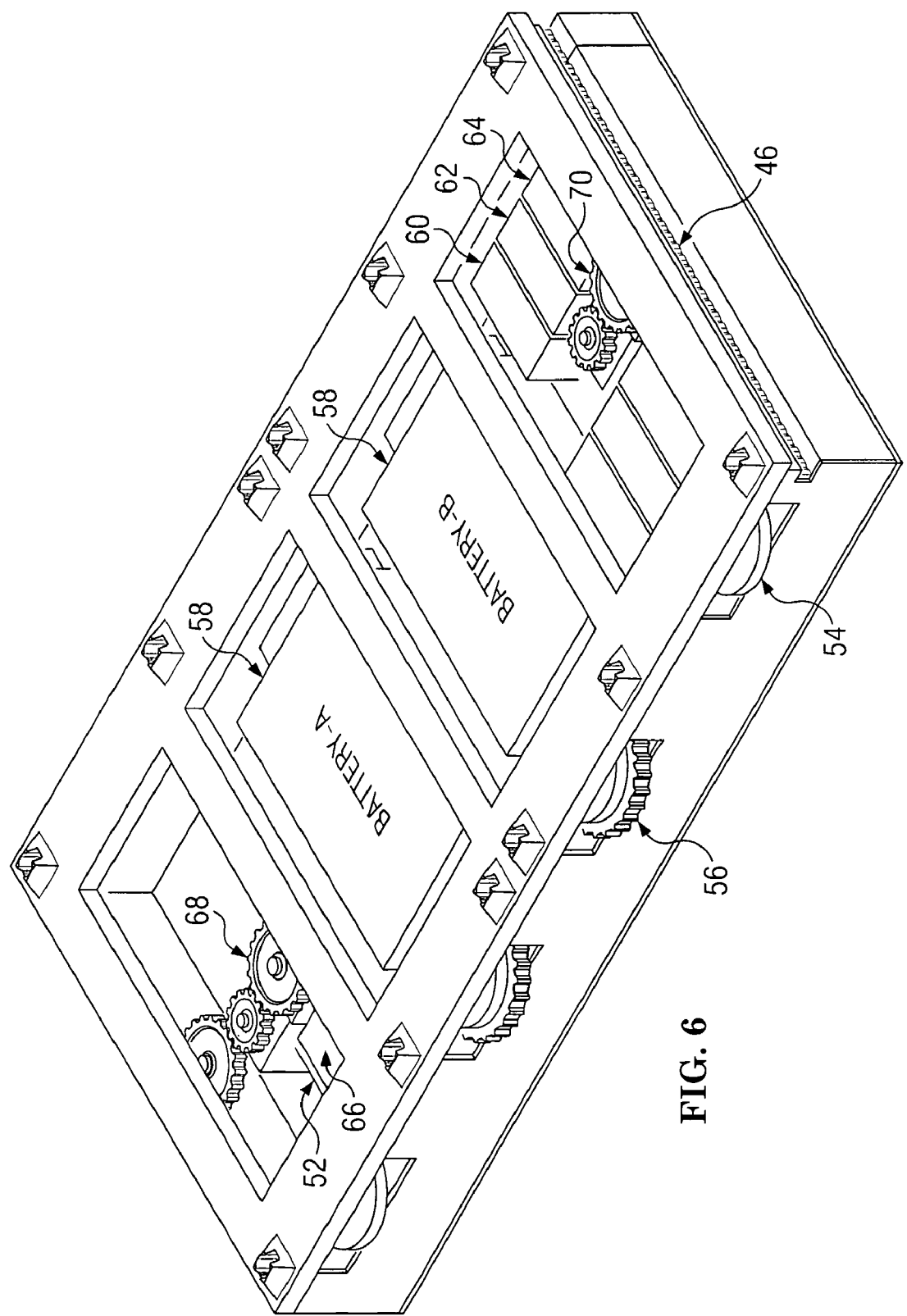
FIG. 6 is an orthographic view of the self-powered pallet carrier and its self-contained drive and power electronics elements.
Figure 7:
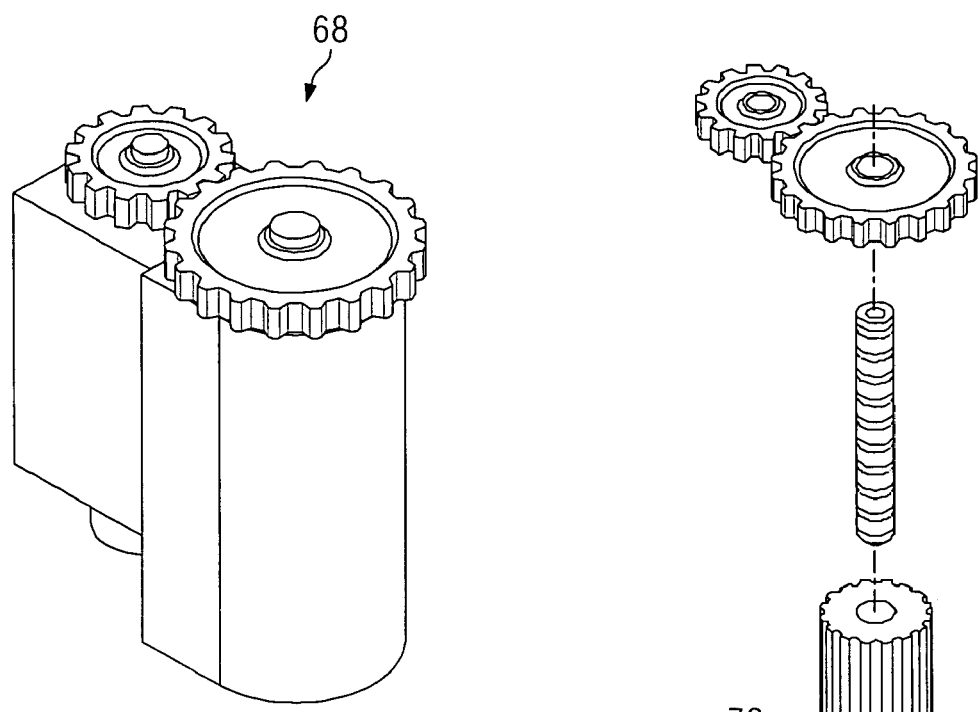
FIG. 7 is an orthographic view of a cylindrical locking pin mechanism contained within the pallet carrier and used to locate and lock individual pallet carriers to the deck or subfloor when stopped.

FIG. 6 provides an orthographic view of the pallet carrier 32 with access panels removed to show its internal components. FIG. 6 also shows the actuators which drive the pallet carrier 32 in x and y axes, the amplifiers and related electronics which provide the power to the drive system 50, a motion controller 66 which regulates the on-board servo systems to move the pallet carrier 32 to the appropriate position within the slide matrix 30, and the locking pins which are utilized when the pallet carrier 32 is not in motion within the slide matrix 30.

In a preferred embodiment, the drive system 50 in the pallet carrier 32 includes two edge-mounted actuators, either of which may be operated independently to drive the pallet carrier and its attached payloads in the x axis or y axis within the slide matrix 30. In normal operation, the pallet carrier 32 is driven in x or y by its onboard actuator and the actuator on the stationary pallet carrier 32 adjacent to it within the slide matrix 30. These actuators subsystems are designed in such a way that either of the two adjacent pallet carriers 32 can independently move the entire load being moved, thus providing redundancy such that a pallet carrier can be advanced within the slide matrix 30 even in the event of a drive failure. Each pallet carrier incorporates a complete set of power amplifiers 64 and power supplies 62, an intelligent servo-controller for each axis drive, and a regenerative braking system 60 that has the capability to return electricity generated during deceleration to a pair of on-board battery packs 58, preferably nickel-cadmium batteries. In a more preferred embodiment that x and y actuators comprise a brushless DC servomotor, a failsafe-powerdown brake, a brushless resolver, a planetary gear head, an electromagnetic clutch, a brushless servo amplifier, a power supply and a regeneration module. For example, the x-axis actuator can utilize the Kollmorgen Model B-602-B Brushless DC Servomotor, a Kollmorgen B-60X Failsafe-Powerdown Brake (Direct-Coupled), a Kollmorgen Size 11 Brushless Resolver (Direct-Coupled), a Kollmorgen Size 5 Right-Angle Planetary Gear Head, a Kollmorgen BDS4A-220 Brushless Servo Amplifier, a Kollmorgen PSR4/5 Power Supply, and a Kollmorgen LR-1 Series Line Regeneration Module. While the y-axis actuator can employ a Kollmorgen Model B-606-B Brushless DC Servomotor, a Kollmorgen B-60X Failsafe-Powerdown Brake (Direct-Coupled), a Kollmorgen Size 11 Brushless Resolver (Direct-Coupled), a Kollmorgen Size 5 Right-Angle Planetary Gear Head, a Kollmorgen BDS4A-240 Brushless Servo Amplifier, a Kollmorgen PSR4/5 Power Supply, and a Kollmorgen LR-1 Series Line Regeneration Module.

In a preferred embodiment of the invention, the motion controller 66 is a PC/CPU which can accept commands for the next required indexing motion to be made by the pallet carrier 32 and provides autonomous control between such commands.

Figure 8:
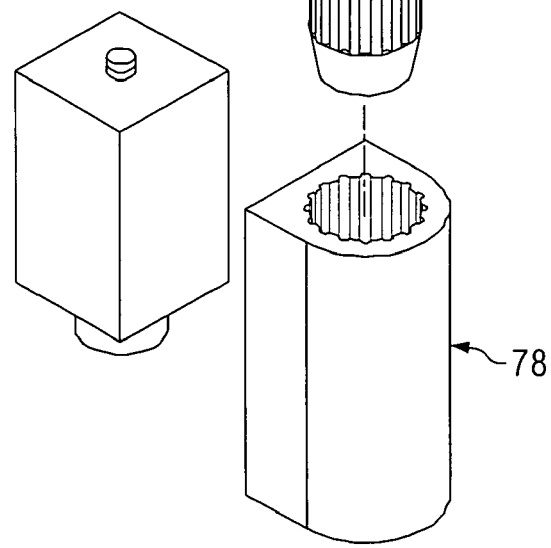
FIG. 8 is an exploded view of the cylindrical locking pin mechanism.
Figure 10:
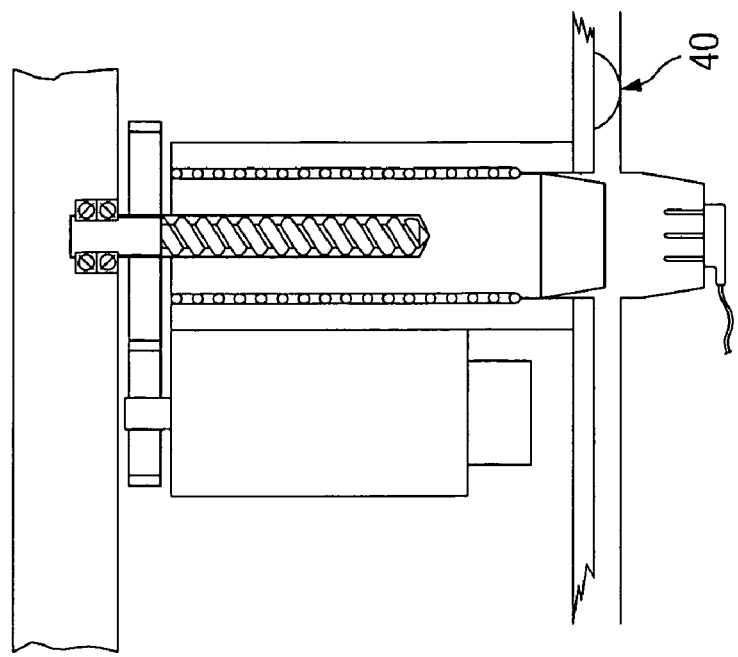
FIG. 10 is a cross-sectional view of the cylindrical locking pin and floor socket showing the pin in its engaged position.
Figure 9:
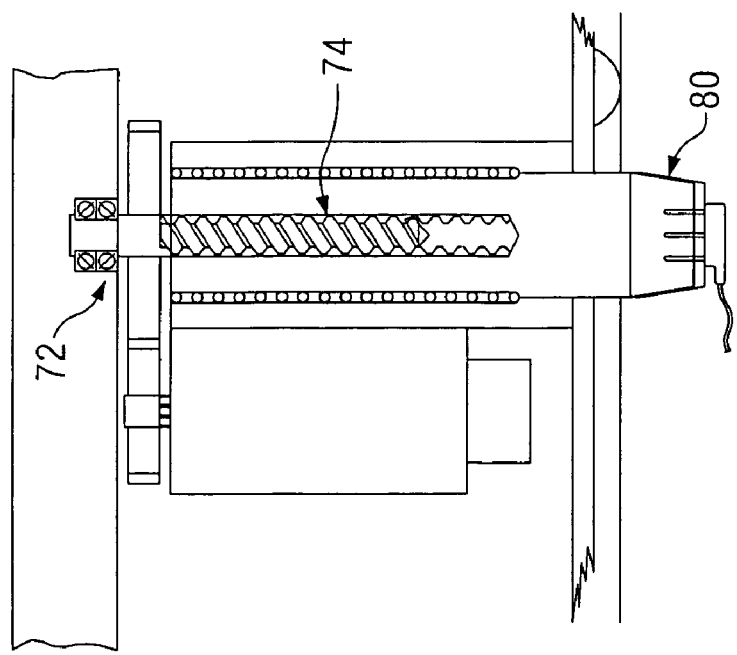
FIG. 9 is a cross-sectional view of the cylindrical locking pin and floor socket showing the pin in its disengaged position.
Figure 11:
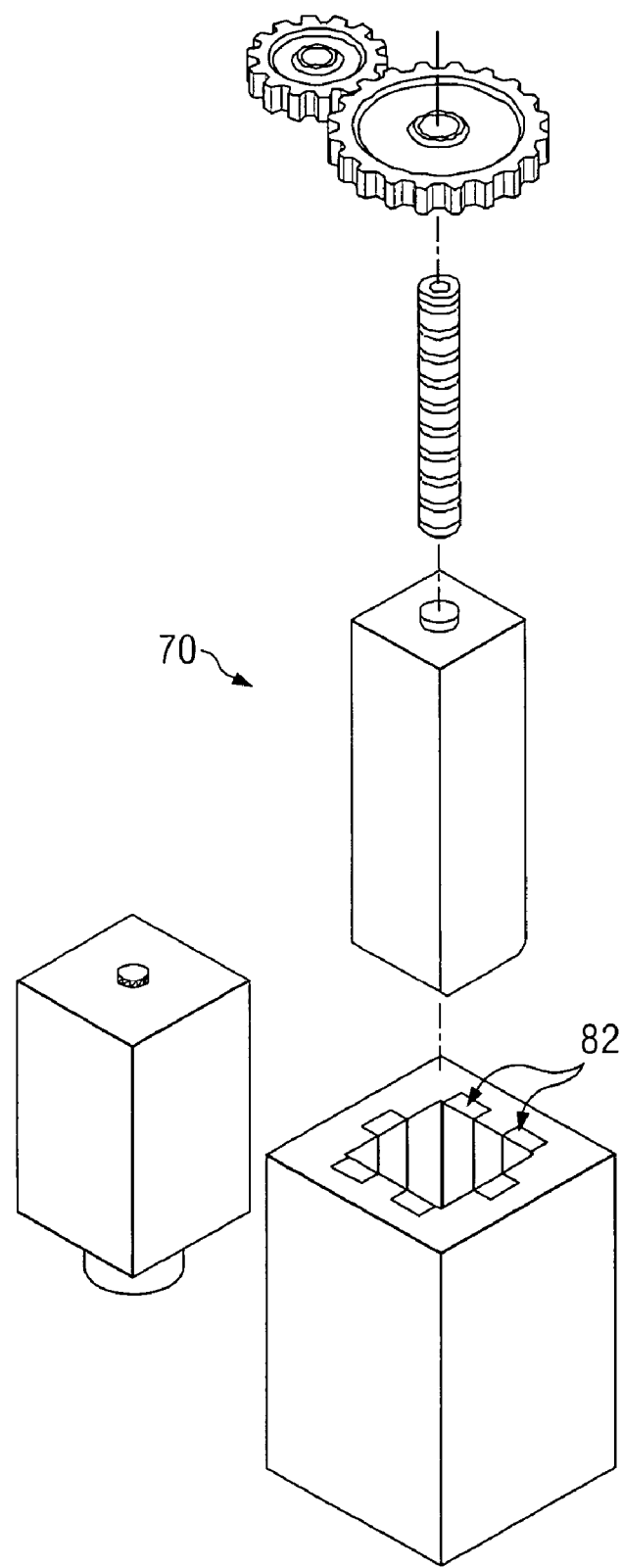
FIG. 11 is an exploded view of a square locking pin mechanism contained within the pallet carrier and used to locate and lock individual pallet carriers to the deck or floor when stopped.
Figure 13:
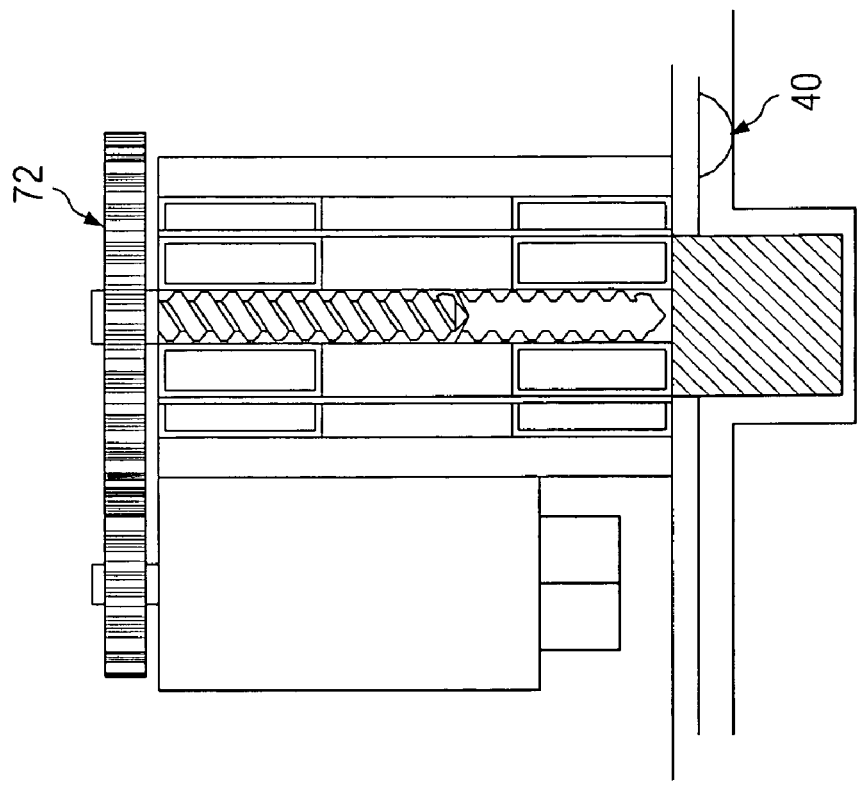
FIG. 13 is a cross-sectional view of the square pin locking pin and floor socket showing the pin in its engaged position.
Figure 12:
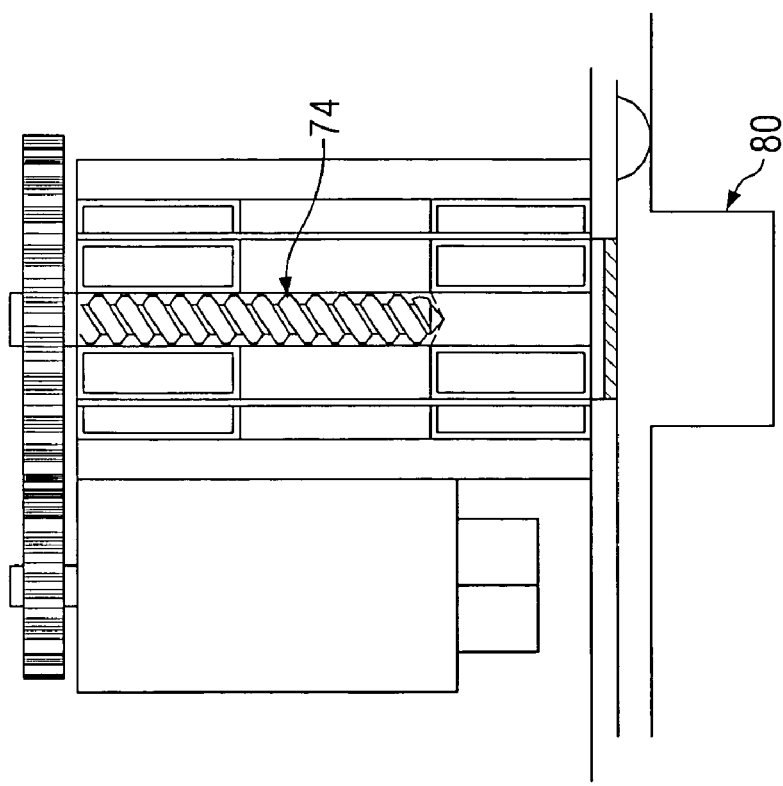
FIG. 12 is a cross-sectional view of the square locking pin and floor socket showing the pin in its disengaged position.

Finally, in another preferred embodiment of the invention, vertical locking pins are utilized to secure the pallet carrier 32 to the deck or subfloor when it is stopped within the slide matrix 30. A cylindrical steel pin 68 and a square steel pin 70 is provided that engage sockets 80 in the deck or subfloor, as illustrated by FIGS. 9–10 and 12–13. In most circumstances, only a single pallet carrier 32 is moved at any one time, guided and driven by the edge-mounted actuator and bearing system. All other pallet carriers 32, which are stationary, are locked to the deck or subfloor using the cylindrical 68 and square 70 pins. In this context, the loads imposed by ship roll and pitch motion upon the whole system of pallet carriers 32 in high seas are not transferred across the slide matrix 30, but are reacted locally into the deck or subfloor structure by the cylindrical pin 68 and square pin 70 in each pallet carrier 32 and their associated deck-mounted sockets 80. In a more preferred embodiment, illustrated in FIGS. 8–10, the cylindrical pin 68 is three-inches in cross-section, tapered at the bottom, having a splined shaft 76 and ball spline nut 78 arrangement to react to loads and prevent pin rotation. The square pin 70 is supported on high-capacity roller bearing packs 82, as shown in FIG. 11. The drive mechanism for both the cylindrical 68 and square 70 pin are otherwise identical. In a more preferred embodiment, FIGS. 9–10, 12–13 show that, in order to engage either the cylindrical 68 or square 70 pin with a socket 80 in the subfloor, a brushless DC servomotor 52 with a planetary gear head is provided to drive an acme drive screw 74 up and down in the center of the pin, with motor shaft-mounted resolver feedback (not shown) provided to measure the position of the pin. In a still more preferred embodiment of the invention, FIGS. 9 and 10 illustrate how the cylindrical pin 68 can be used as a means to connect the pallet carrier 32 to both line power for battery pack 58 recharging (not shown) and to a digital communications bus for high-level indexing command updates and status reports (not shown) whenever the pallet carrier 32 is stopped and the cylindrical pins 68 are engaged with the sockets 80 in the subfloor. Each time a pallet carrier 32 stops at any given location within the slide matrix 30 and the cylindrical 68 and square 70 locking pins are driven into the sockets 80, the cylindrical pin 68 will simultaneously engage a two-pin electrical connector. One connector pin will supply low-voltage power to the pallet carrier's on-board battery pack 58 charger(s) and the other pin will connect the pallet carrier's on-board PC/CPU to a high-speed communications bus for as long as the unit remains locked in place at that particular point within the slide matrix 30.

As an alternative to incorporating one or more batteries or other suitable power storage system such as fuel cells within each self-powered pallet carrier 32 to provide power continuously to the PC/CPU and RF LAN communications subsystem, and to provide power intermittently to the pallet carrier's x-axis or y-axis drive actuators, electrical power could be delivered to the pallet carriers 32 on a continuous basis via a non-contact inductive power distribution system, similar to the primary-to-secondary energy conversion of a transformer. In this embodiment, an x-y matrix of paired cables embedded in the deck or subfloor of the hold or magazine would provide primary power input to the pallet carriers 32 and a second winding contained within each pallet carrier. Current induced into the secondary pickup coil in each pallet carrier would be rectified and converted as required to operate the pallet carrier's x-y servo drives, computers, and other onboard electrical equipment. This embodiment has the advantage of being nearly maintenance-free, eliminates electrical noise, and can tolerate environmental contamination.

Finally, in order to effectively implement the slide matrix 30 for an array of pallet carriers 32, a fixed frame 156 that extends around the perimeter of the slide matrix 30 must be provided. In a preferred embodiment of the invention, the fixed frame 156 around the hold or magazine of a naval vessel comprises a set of guide rollers and drive gears on two edges and a set of guideways and racks on the other edges, identical to those used on each pallet carrier 32. These drive gears and guide rollers perform the same guidance and x-y actuation functions for the pallet carriers 32 in the outermost rows of the slide matrix 30 as those afforded by adjacent pallet carriers 32 that happen to reside within the center of the slide matrix 30. Furthermore, the fixed frame 156 serves as a walkway for personnel around the perimeter of the pallet carriers 32 within the slide matrix 30 when the storeroom containing the cargo is filled.

Figure 18:
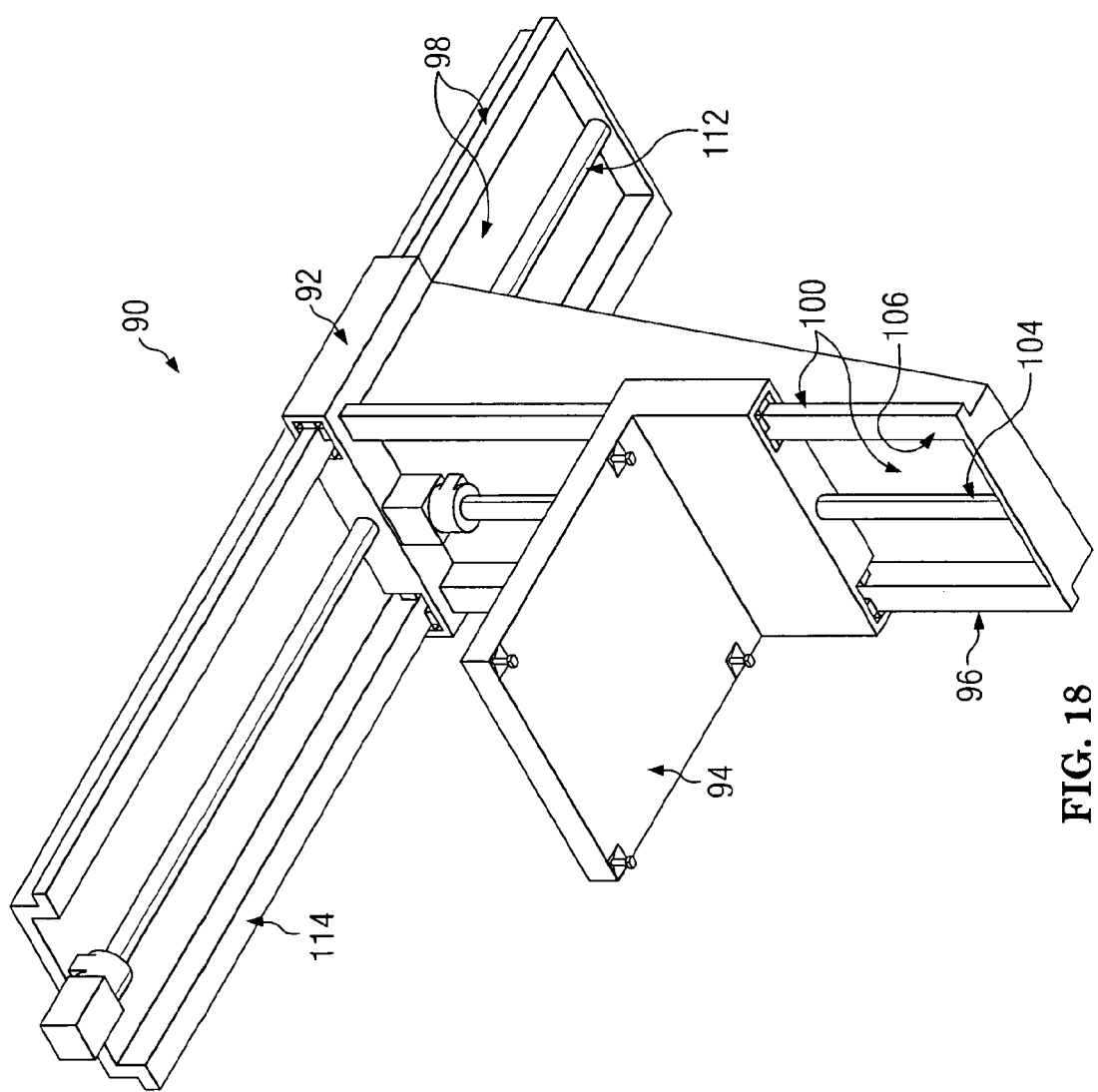
FIG. 18 is an orthographic view of the robotic manipulator illustrating the horizontal and vertical slide assemblies.
Figure 19:
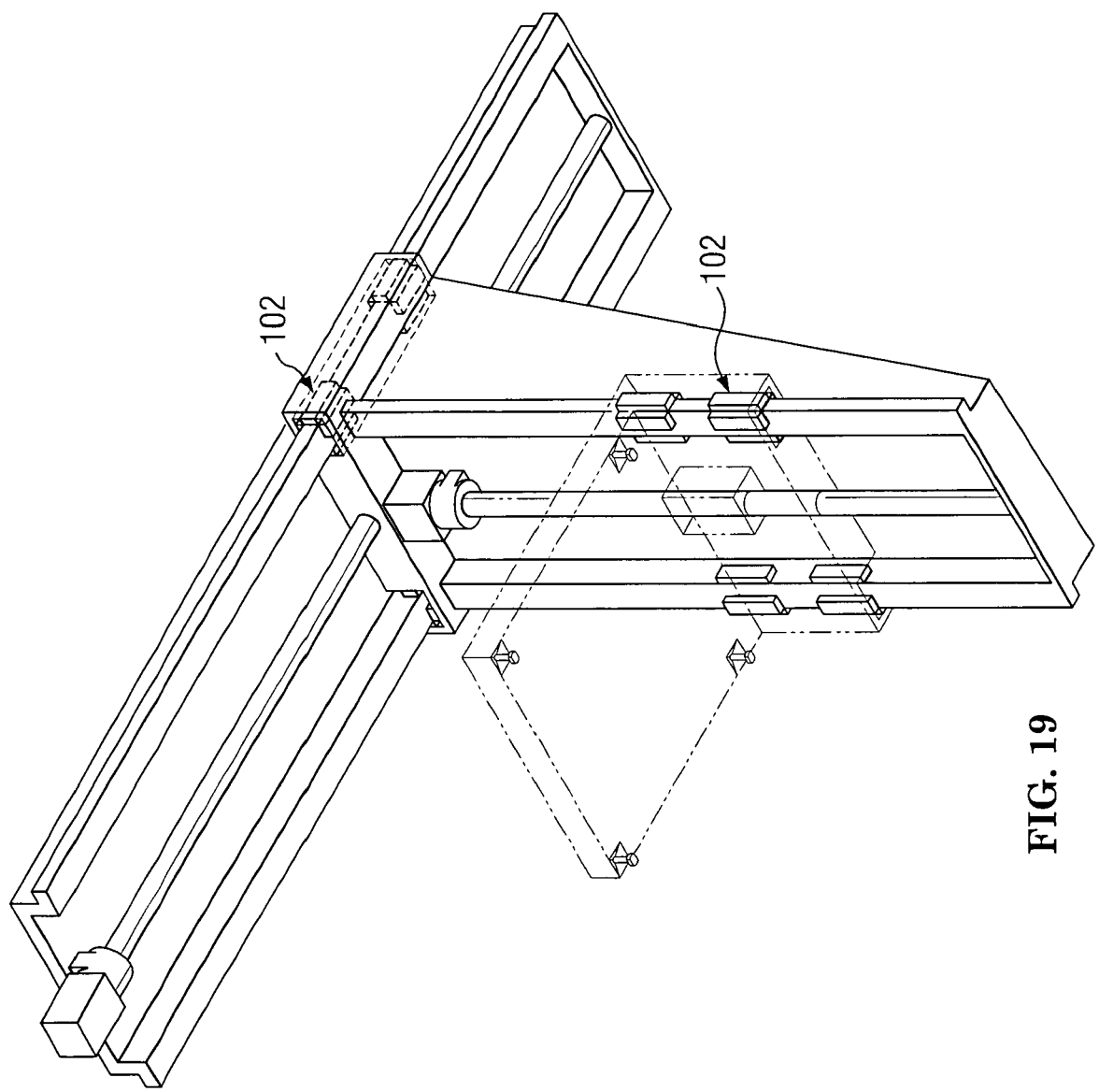
FIG. 19 is an orthographic view of the robotic manipulator illustrating the recirculating roller bearing packs.
Figure 20:
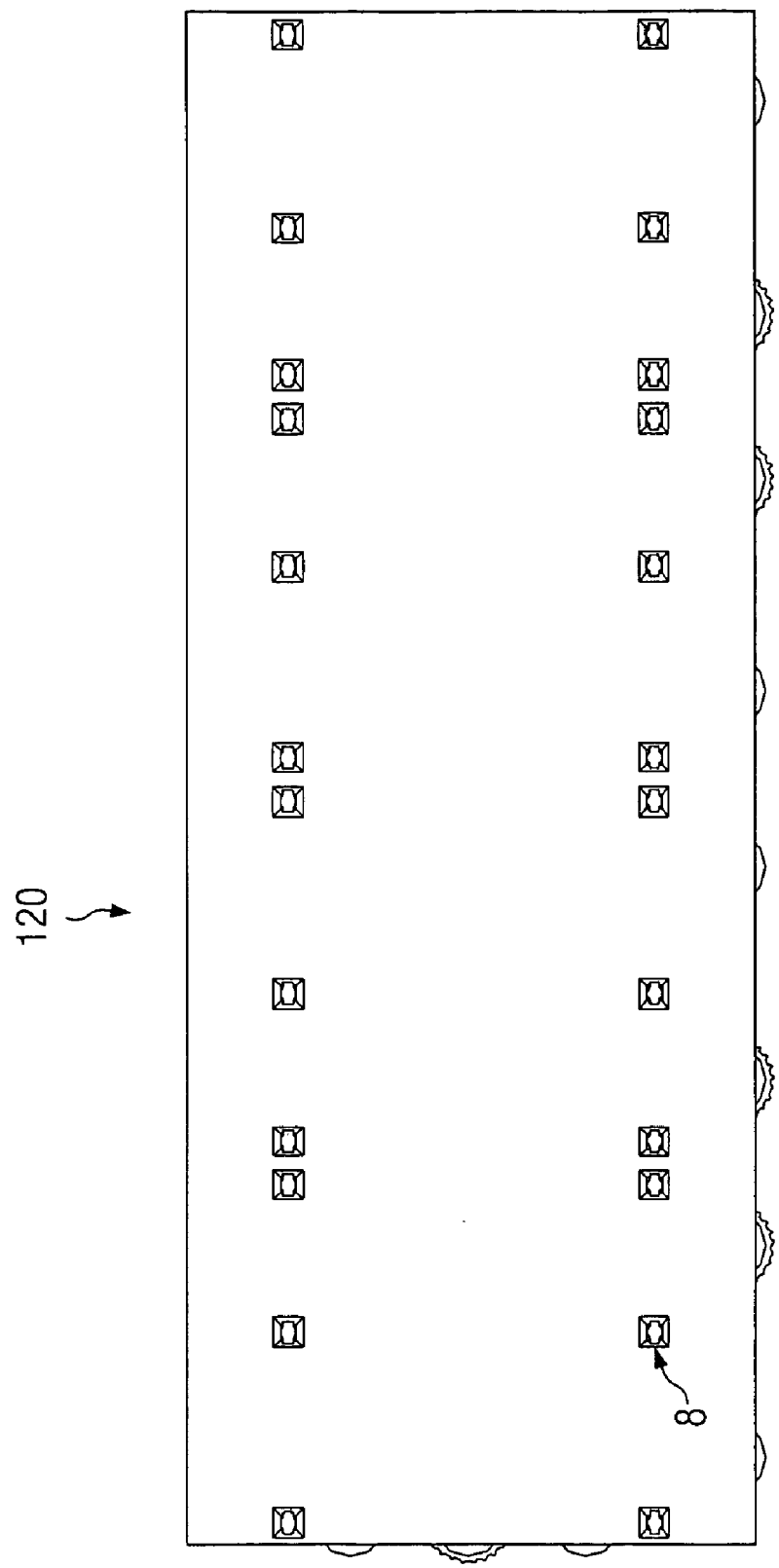
FIG. 20 is a plan view of an elevator tray illustrating the standard payload interface cam-lock receptacles.

FIGS. 18 and 19 are orthographic views of the robotic manipulator 90 illustrating the horizontal 92 and vertical 94 slide assemblies utilized to stack and unstack standard payload interface fixtures 2 in the stowage and retrieval system. The robotic manipulator 90 comprises a horizontal slide assembly 92, a vertical slide assembly 94 including a cam-lock tool 22 which provides the gripping and retention mechanism for moving the payloads, and a vertical column 96 attaching the vertical slide assembly 94 to the horizontal slide assembly 92. The robotic manipulator 90 is a high-capacity, two-axis system designed to acquire and lock or unlock individual standard payload interface fixtures 2 from other standard payload interface fixtures 2 that are stacked on a pallet carrier 32, or directly from a pallet carrier 32 when such pallet carrier 32 is located in one particular location within the slide matrix 30, designated the "load/unload station" 152. The robotic manipulator is also used to move those standard payload interface fixtures 2 out of the slide matrix 30 and to deposit and relock the standard payload interface fixtures 2 onto an elevator loading tray 120. As described previously herein, when acquiring a payload, the cam-lock tool 22 located on the vertical slide assembly 94 engages the cam-lock receptacle 8 and its associated cam-lock mechanism 12 in the stanchion 6, as shown in FIG. 2, rigidly locking onto the standard payload interface fixture and its pallet or container and simultaneously disengaging the payload from the payload beneath it in a stack or from the pallet carrier 32 itself.

FIG. 18 illustrates how the horizontal slide assembly 92 achieves its x-axis motion using a machine tool style bed 98 and guideway 100 rigidly fastened to the ceiling of the magazine (not shown) and the structural beams therein. Attached to the horizontal slide assembly 92 is a vertical column 96 that carries the vertical way 104 and rail 106 and vertical slide assembly 94. The vertical slide assembly 94 is fastened to the front face of the vertical column 96. The vertical slide assembly 94 rides along the way 108 of the overhead-mounted horizontal rail 110. The horizontal slide assembly 92 and vertical slide assembly 94 are independently driven by ball screws, each fixed at either end of the slide assemblies by a pair of angular contact bearings and an antifriction ball nut fastened to the underside of either slide assembly. In a preferred embodiment the ball screw is driven by a brushless DC servomotor 52 with an inline planetary gear head. The servomotor 52 used in connection with the vertical slide assembly 94 is located inside the vertical column 96 and mounted parallel to the ball screw axis and connected to the inline planetary gear head by a timing belt (not shown). Large, removable panels on the sides of the vertical column 96 provide ready access to the servomotor 52.

In a more preferred embodiment of the invention, the actuators driving the horizontal slide assembly 92 and vertical slide assembly 94 comprise a brushless DC servomotor, a failsafe-powerdown brake, a brushless resolver, a brushless servo amplifier, a power supply, and a ball screw and ball nut arrangement. For example, the actuator for the horizontal slide assembly 92 may use a Kollmorgen B-404-B Brushless DC Servomotor, a Kollmorgen B-80X Failsafe-Powerdown Brake (Direct-Coupled), a Kollmorgen Size 11 Brushless Resolver (Direct-Coupled), a Kollmorgen BDS4A-210 Brushless Servo Amplifier, a Kollmorgen PSR4/5 Power Supply, and a D-N Ball Screw and Ball Nut. Furthermore, the actuator driving the vertical slide assembly 94 may utilize a Kollmorgen B-606-B Brushless DC Servomotor, a Kollmorgen B-60X Failsafe-Powerdown Brake (Direct-Coupled), a Kollmorgen Size 11 Brushless Resolver (Direct-Coupled), a Kollmorgen Size 4 Inline Planetary Gearhead, a Kollmorgen BDS4A-240 Brushless Servo Amplifier, a KOLLMORGEN PSR4/5 Power Supply, and a D-N Ball Screw and Ball Nut. Such preferred embodiment provides the necessary support for lifting heavy payloads, such as those in containerized or palletized form on naval vessels.

In another preferred embodiment of the invention, as illustrated in FIG. 19, the horizontal slide assembly 92 and vertical slide assembly 94 further comprise a set of recirculating roller bearing packs 102 attached to the slide assemblies and located between the slide assemblies and the guideways. The recirculating roller bearing packs 102 provide antifriction motion as the horizontal 92 and vertical 94 slide assemblies travel along the x and z axes.

In a preferred embodiment of the invention, the horizontal, x-axis guideway 98 of the horizontal slide assembly 92 is 45 inches wide and employs a pair of rectangular, two inch thick by seven inch wide hardened steel ways 114 which are bolted onto a thick-section, rectangular steel bed. The vertical, z-axis guideway 100 and bed 104 measures 108.5 inches in length, and the horizontal slide assembly 92 measures 32 inches in length and 50 inches in width. The vertical column 96 is comprised of a steel box-section weldment fabricated out of sheet metal with a bottom plate and one or more internal stiffeners. The vertical column 96 is 108.5 inches in length, 45 inches width, and tapers in section from 32 inches thick at the top to 12 inches at the bottom. The vertical column 96 is also designed to clear the top of the pallet carriers 32, elevator loading tray 120, and other features,.within this stowage and retrieval system by two inches. Within this preferred embodiment, the vertical slide assembly 94 measures 24 inches in height and 50 inches in width, providing sufficient space in which to arrange the four cam-lock tools 22 used to grip and retain payloads on the standard payload interface fixtures 2.

Figure 21:
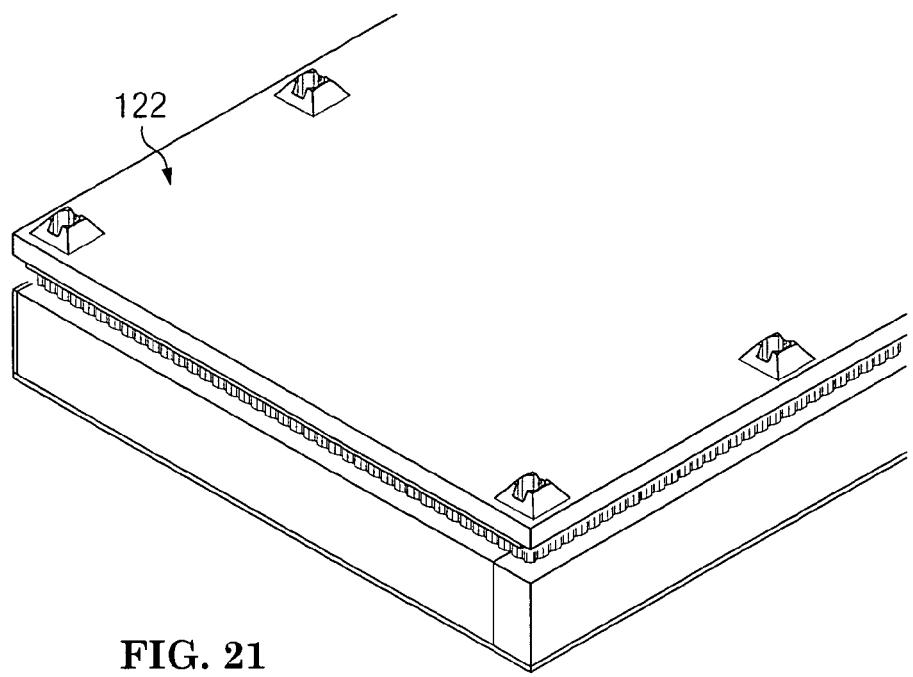
FIG. 21 is a partial orthographic view of the upper surface of the elevator tray illustrating the guideway system and cam-lock receptacles.
Figure 22:
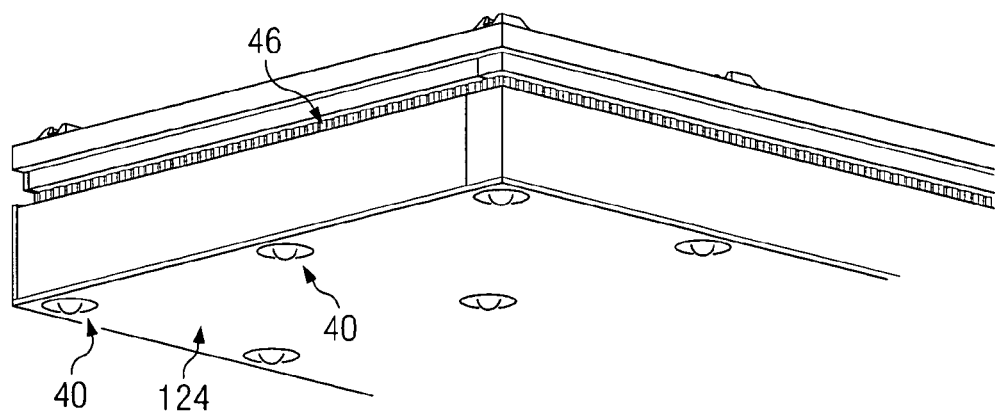
FIG. 22 is a partial orthographic view of the lower surface of the elevator tray illustrating the guideway system and the ball transfer units.
Figure 24:
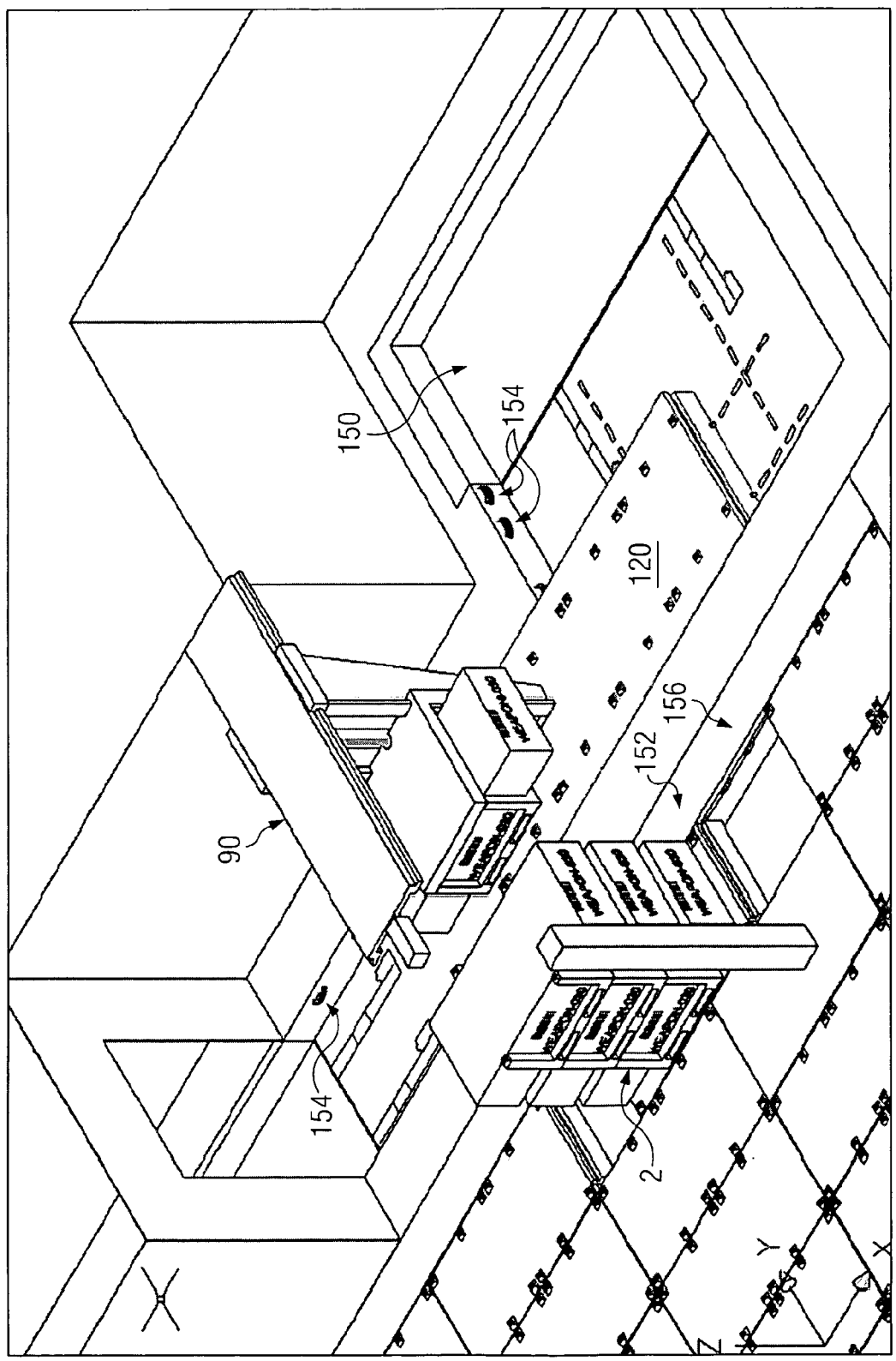
FIG. 24 is an orthographic view of the automated stowage and retrieval system installed in an exemplary hold or magazine illustrating the slide matrix involving the pallet carriers carrying stacked pallets and containers outfitted with standard payload interfaces, the robotic manipulator, and the elevator loading tray subsystems.

FIGS. 21 and 22 are partial orthographic views of the upper and lower surfaces of the elevator loading tray 120, a passive steel box-section structure that serves as an interchangeable elevator platform and provides means to load and unload the service elevators quickly and conveniently. FIGS. 21 and 22 illustrate the elevator loading tray guideway system, cam-lock receptacles 8, and ball transfer units 40. The elevator loading tray 120 comprises cam-lock receptacles 8, antifriction ball transfer units 40, and guideways and drive racks integrated on each edge of the elevator loading tray 120. The elevator loading tray 120 is indexed under the robotic manipulator 90 in order to load or unload payloads. The cam-lock receptacles 8 on the upper surface 122 of the elevator loading tray 120 mate with the receptacle receivers 18 so that the elevator loading tray 120 can be loaded or unloaded by the robotic manipulator 90 with standard payload interface fixtures 2 carrying various payloads. The antifriction ball transfer unit 40 is integrated with the lower surface 124 of the elevator loading tray 120 to provide easy movement along the subfloor, wherein the ball transfer units 40 are similar to that as previous described for the pallet carrier 32. The guideways and drive racks interact with externally-located rollers and an external drive pinion actuator system and associated guides 154 mounted on stationary sides of a fixed frame 156 in which the elevator loading tray 120 passes in order to translate the tray 120 back and forth under the robotic manipulator 90 or drive the it towards a primary elevator 150, as shown in FIG. 24. In a preferred embodiment of the invention, the guide rollers and pinion drive systems for the elevator loading tray 120 will be identical to those used on the pallet carriers 32, but externally mounted, and a total of four or more such drive units will be engaged with the elevator loading tray 120 at all times. In a more preferred embodiment, the rack and pinion drives that move the elevator loading tray 120 have 30 horsepower per side in the y-axis direction and 15 horsepower per side in the x-axis direction, and, as with the pallet carrier 32, are sized such that either side is capable of handling the load independently if one drive fails. Furthermore, the elevator loading tray 120 is rectangular in shape and can be composed of numerous materials, including ferrous and nonferrous metals, and polymer composites. In a still more preferred embodiment, the elevator loading tray 120 is 208 inches in length, 76 inches in width, and 14.5 inches in height and comprises a lightweight aluminum box structure with appropriate internal stiffeners and a set of steel inserts for the cam-lock features.

In another preferred embodiment the elevator loading tray 120 becomes the platform of the elevator once loaded into the elevator 150. Two sets of auxiliary guide wheels 54, fixed to the deck and running in slots in the bottom of the elevator loading tray 120, are provided at the junction of the x- and y-axis frame to guide the elevator loading tray 120 into the elevator 150. A pair of linear actuators, each outfitted with locking mechanisms that automatically engage the elevator loading tray 120, are employed at the entrances to both the primary elevator 150 and an auxiliary elevator (not shown) to drive the elevator loading tray 120 onto or off of the elevator. Once the elevator loading tray 120 is on the elevator, it is securely retained by a set of locking pins integral to the elevator.

In an alternative embodiment of the invention, the elevator is designed such that it has the capacity to carry two elevator loading trays, one above the other, as interchangeable and exchangeable elevator platforms. Once an elevator loading tray 120 carrying payloads out of the hold or magazine has been moved onto the elevator, the elevator will index up, and a second, identical, but empty elevator loading tray 120 will automatically be removed from the elevator before the elevator leaves for another deck.

Figure 23:
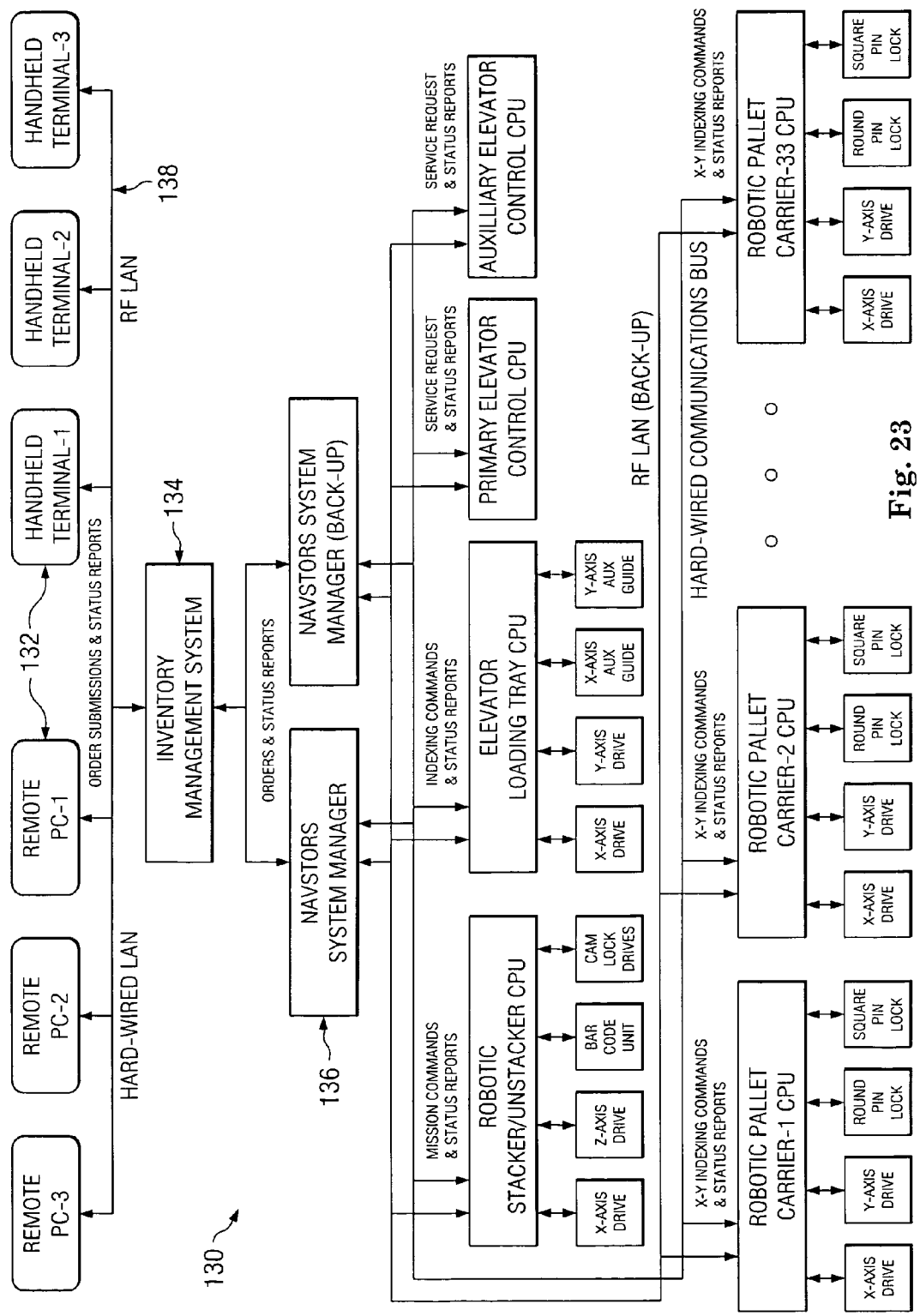
FIG. 23 is a diagram illustrating the system controller overseeing the automated stowage and retrieval system and interfaces.

FIG. 23 shows the architecture of the distributed system controller 130 that regulates the various subsystems comprising the automated stowage and retrieval system, and accepts commands from and issues reports to several associated systems. The system controller 130 comprises PC's and handheld terminals 132, an inventory management system 134, a system manager 136, such as NAVSTORS, and local controllers for each automation element associated with the stowage and retrieval system.

The PC's and handheld terminals 132 are used to submit an order or to check delivery status regarding inventory in real-time. The inventory management system 134, interfaced to the system controller 130, establishes order priority and provides real-time tracking and analysis of inventory overseen by all stowage and retrieval systems on the ship. The system manager 136 coordinates the operation of a specific automated magazine or hold. Local controllers are incorporated in each pallet carrier 32 in the system, as well as the robotic manipulator 90, and the elevator loading tray drive system.

As shown in FIG. 6, the pallet carriers 32 will each be outfitted with an on-board PC/CPU that periodically receives and executes high-level indexing commands, performs low-level servo-control functions for the x- and y-axis servo drives, and provides status reports. Said PC/CPU will accept indexing move commands from and provide status reports to the system manager 136 via a hard-wired serial communications bus when the a pallet carrier 32 is stopped and its locking pins and their electrical connectors are engaged (not shown). In a preferred embodiment of the invention, a radio-frequency modem will also be incorporated in each pallet carrier 32 enabling communication through a local area RF local area network (LAN). Having this RF link will allow the system manager 136 to communicate with a pallet carrier 32 when it is between matrix stop points and not engaged with the hard-wired communication bus.

The robotic manipulator 90 will be operated by a similar local PC which receives and executes high-level motion commands in tool coordinates. The system manager database will maintain current information on each individual standard payload interface fixture 2 including a bar code identification number, contents, a pallet carrier 32 unit number and its x-y position within the slide matrix 30, a payload location on the pallet carrier 32, stanchion height of the unit, current stack position, and payload mass. From such information, slide motion commands will be specified by the system manager 136 for each pallet carrier 32 to execute a given load or unload operation. A library containing all of the possible motion control subroutines will be stored locally in the robotic manipulator. A torque-loop servo control system will be particularly important for the robotic manipulator 90, providing means to utilize compliance control or impedance control algorithms that assure stability during contact operations and to automatically adjust the robotic manipulator's position based on contact forces and torques to accommodate minor position errors between the mechanical elements. The robotic manipulator 90 also communicates with the system manager 136 via a high-speed, hard-wired serial bus, providing status reports to the system manager 136. The robotic manipulator 90 is equipped with a bar code reader to identify the payloads it is handling and to provide reports of such to the inventory management system 134 through the system manager 136.

The stationary x-axis and y-axis servo drives and associated guide systems that index the elevator loading tray 120 under the robotic manipulator 90 and move it automatically onto the elevators is also controlled by a local PC/CPU. Once again, all high-level motion commands for the drives surrounding the elevator tray 120 are issued by the system manager 136 and status reports are returned on a periodic basis via a hard-wired communication bus and back-up RF LAN 138.

In a preferred embodiment, the system manager 136 is a PC located in a convenient place within or near the room containing the automation elements. This PC accepts orders for specific weapons or cargo from the inventory management system 134 and executes those orders by scheduling and sending high-level commands to the pallet carriers 32, robotic manipulator 90 and elevator loading tray's 120 onboard computers via a hard-wired communications bus or a back-up RF LAN 138. A graphical user interface (not shown) is provided to enable personnel to monitor the current state of the inventory in the hold or magazine, as well as the status of all the elements of the automation system. In another embodiment, a real-time computer animation may be utilized to assist in visualization of the system operation. A back-up system manager is also provided that can assume control automatically in the event of a hardware failure in the primary CPU.

The system manager 136 will deal with real-time changes in priority as needs are updated. The system manager 136 will run a special algorithm that controls the movement of the pallet carriers 32 within the slide matrix 30 based on the weighting assigned to different criteria. For example, the system manager 136 will have the ability to automatically preposition payloads within a magazine or hold close to the loading/unloading station 152 in order to speed up the retrieval process when a request is received. In a preferred embodiment, the system manager 136 will also be able to issue service requests to the elevator controls. In a more preferred embodiment, the elevator control system will independently handle scheduling between decks based on elevator platform location and current order priorities.

In a preferred embodiment of the invention, the inventory management system 134 and system manager 136 will communicate with PCs throughout the naval vessel via a ship's hard-wired local area network, and with handheld units via the RF LAN 138, to submit and check orders, and to ensure real-time operation and availability of inventory information.

EXAMPLE

One specific application for the present invention regarding an automated stowage and retrieval system includes weapons handling in Magazine 6-128-0-M on U.S. Navy Nimitz-class aircraft carriers CVN-71 through CVN-76. However, the automation system described herein could be readily utilized for weapons handling applications in many other magazines aboard aircraft carriers and other types of naval vessels, as well as for handling palletized stores of all types in the holds of both naval and civilian vessels, including cruise ships, which require access to cargo while at sea en route to destination; therefore the following weapons handling application is only meant to be exemplary in nature, and not restrictive.

A six by six slide matrix is provided for a set of 33 self-powered pallet carriers with their long sides oriented in the ship's y-axis, or starboard-port. Two matrix spaces containing stationary "islands" that accommodate the two structural I-beam columns in this magazine are provided, and one space is left unoccupied to allow the pallet carriers to move within the slide matrix. During operation, that particular pallet carrier which happens to contain a payload requested by a user is identified by the system manager. The indexing control algorithm then selects a pattern of moves that will bring the requested pallet carrier from its initial location up to the load/unload station in front of the robotic manipulator, taking into account the motion prioritization scheme that is in effect. A series of step-wise pallet carrier motions then begins with motion control commands periodically being issued by the system manager and being executed by the on-board pallet carrier controllers.

Three pallet carrier indexing moves are most often required in the slide matrix to advance a given pallet carrier one space toward the load/unload station in front of the robotic manipulator. Two additional moves may be required first to position the empty space properly. Several strategies for moving the pallet carriers employed can be used. One method is to move as few pallet carriers as possible to reduce energy consumption. A second method might seek to move the least total mass possible which favors indexing moves by unloaded pallet carriers when possible. Once the pallet carrier arrives at the load/unload station in the slide matrix, it can be positioned at any of three different stop points along y-axis. Palletized loads, stacked or not, are situated on the ends of the pallet carrier and two sets of four cam-lock receptacles are provided to secure such loads in those locations. Longer, containerized loads, stacked or not, are situated in the center of the pallet carrier and one set of four cam-lock receptacles are provided to secure such loads in that location. Once the pallet carrier stops moving in the load/unload station, the robotic manipulator proceeds to move over the top of the desired payload. Before acquiring it, the robotic manipulator uses its bar code reader, located in a fixed position on the vertical slide assembly, to verify that the payload is the one requested, and to communicate this data to the control system manager. The robotic manipulator then lowers its vertical slide assembly and rotates its four servo-driven cam-lock tools to engage the uppermost standard payload interface fixture, simultaneously unlocking it from the next lower standard payload interface using the cam-lock mechanisms housed within the stanchions.

The robotic manipulator's horizontal slide assembly then retracts and, after the payload has cleared the stack, the vertical slide assembly simultaneously begins to descend an appropriate distance, based upon what other pallets or containers may already be secured to the elevator loading tray. Finally, the robotic manipulator lowers the standard payload interface fixture onto the elevator loading tray or onto a stack of other standard payload interface fixtures already on the elevator loading tray. The robotic manipulator's cam-lock mechanism then disengages the standard payload interface fixture and simultaneously locks it securely in place. This sequence requires approximately 20 seconds. As soon as the payload clears the slide matrix, while the robotic manipulator is at work, a new pallet carrier delivering the next requested payload begins indexing toward the load/unload station.

The process continues in this manner until all of the requested payloads contained on standard pallets have been secured to the elevator loading tray, or until the elevator loading tray is filled to capacity. At that point, a request for an elevator is automatically issued by the system manager. When the elevator arrives the elevator loading tray is automatically slid into it, either onto a fixed elevator platform, or in place of the elevator platform. In the latter case, before the elevator leaves the magazine, it moves up some distance, nominally 18 inches, and an empty elevator loading tray is automatically withdrawn from a slot located beneath the loaded unit. Elevator loading trays are thus cycled through the system, with an empty elevator loading tray always available in each magazine or hold.

The system described in this example has been configured specifically to perform weapons handling operations within magazines of naval vessels with the heaviest weapons loads in sea state 5, and to survive sea state 8 in a standby mode. However, the automated stowage and retrieval system that is the object of the present invention can readily be configured for magazines and holds of different sizes and layouts. Furthermore, the key elements can be optimized to suit other types of payloads. For example, the pallet carriers can be made larger to accommodate very long cargo, longer weapons for instance. Alternatively, the design of the standard payload interfaces and pallet carriers could be optimized for lighter payloads by utilizing structural plastic materials and lower-capacity drives.

I claim:

1. An automated stowage and retrieval system for the selective loading and unloading of a payload comprising:
   at least one standard payload interface configured to provide access to a desired payload and to allow for transportation of the desired payload, the standard payload interface comprises a plurality of engageable portions;
   a plurality of carriers configured in a slidable storage matrix each configured with corresponding engageable portions configured to interface with the engageable portions of the standard payload interface to generally maintain the standard payload interface in substantially fixed contact with the carriers;
   a robotic manipulating unit operably configured to engage and disengage the standard payload interface to move the standard payload interface to and from the plurality of carriers;
   a tray configured to receive and provide the standard payload interface from and to the robotic manipulating unit, wherein the tray is configured with corresponding engageable portions to interface with the engagable portions of the standard payload interface to generally maintain the standard payload interface in substantially fixed contact with the tray, and wherein the tray is operably configured for movement to and from the robotic manipulating unit; and
   a controller configured to instruct the system for the selective loading and unloading of the standard payload interface relative to the slidable storage matrix.

2. The system as recited in claim 1, wherein the engageable portions of the standard payload interface comprises a plurality of receptacle receivers configured for substantially fixed contact with the corresponding engageable portions of the carriers and the tray.

3. The system as recited in claim 1, wherein the robotic manipulating unit comprises a slidable horizontal assembly and slidable vertical assembly jointly connected by a support member.

4. The system as recited in claim 3, wherein the slidable horizontal assembly comprises a gripping mechanism configured to load and unload the standard payload interface.

5. The system as recited in claim 3, wherein the robotic manipulating unit comprises a sensor device.

6. The system as recited in claim 5, wherein the sensor device comprises a bar code scanner.

7. The system as recited in claim 1, wherein the tray comprises a guideway extending along two axes of the tray configured to provide for movement of the tray to and from the robotic manipulating unit.

8. The system as recited in claim 1, wherein the controller is a PC-based controller.

9. The system as recited in claim 1, wherein the standard payload interface is integral with a payload pallet or container.

10. The system as recited in claim 1, wherein the controller comprises instructions executing an algorithm that moves the carriers within the slidable storage matrix to allow for the desired payload to be moved to a predetermined location within the slidable storage matrix and removed from the respective carrier by the robotic manipulating unit to the tray.

* * * * *